United States Patent
Chen et al.

(10) Patent No.: US 11,609,559 B2
(45) Date of Patent: Mar. 21, 2023

(54) DATA PROCESSING SYSTEM AND METHOD

(71) Applicant: INDUSTRIAL TECHNOLOGY RESEARCH INSTITUTE, Hsinchu (TW)

(72) Inventors: Hsin-Chi Chen, Taichung (TW); Chuang-Hua Chueh, Taipei (TW); Chun-Fang Chen, Hukou Township, Hsinchu County (TW); Chi-Heng Lin, Taichung (TW); Chun-Hsu Chen, Hukou Township, Hsinchu County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 345 days.

(21) Appl. No.: 16/874,434

(22) Filed: May 14, 2020

(65) Prior Publication Data

US 2021/0200196 A1     Jul. 1, 2021

(30) Foreign Application Priority Data

Dec. 30, 2019  (TW) ................................ 108148346

(51) Int. Cl.
*G06F 11/00* (2006.01)
*G05B 23/02* (2006.01)
(Continued)

(52) U.S. Cl.
CPC ..... *G05B 23/0227* (2013.01); *G05B 19/0405* (2013.01); *G05B 19/048* (2013.01); *G06F 11/008* (2013.01)

(58) Field of Classification Search
CPC ............ G05B 23/0227; G05B 19/0405; G05B 19/048; G05B 23/024; G06F 11/008; F23G 7/066; F23G 5/50
See application file for complete search history.

(56) References Cited

U.S. PATENT DOCUMENTS 7,027,953 B2   4/2006  Klein
8,352,216 B2   1/2013  Subbu et al.
(Continued)

FOREIGN PATENT DOCUMENTS

CN   103198207 A     7/2013
CN   106600076 A  *  4/2017   ............. G06Q 10/04
(Continued)

OTHER PUBLICATIONS

Hao et al. "Numerical simulation of a regenerative thermal oxidizer for volatile organic compounds treatment", (Year: 2018).*
(Continued)

*Primary Examiner* — Eyob Hagos
(74) *Attorney, Agent, or Firm* — Birch, Stewart, Kolasch & Birch, LLP

(57) ABSTRACT

A data processing system, including a cyclic correlation establishing module, a data pattern establishing module, and a data pattern alignment module, is provided. The cyclic correlation establishing module receives a plurality of first sensor data, obtained from a first sensor operation performed on processing devices, and receives a table of processing steps and cyclic procedures. The cyclic correlation establishing module obtains a data correlation of the first sensor data according to the number of sample points in a data cycle of the first sensor data and the table to correct the first sensor data. The data pattern establishing module obtains a plurality of first data pattern features from the first sensor data. The data pattern alignment module aligns a plurality of second sensor data obtained from a second sensor operation performed on the processing devices with the first sensor data according to the first data pattern features.

20 Claims, 17 Drawing Sheets

(51) Int. Cl.
   *G05B 19/048* (2006.01)
   *G05B 19/04* (2006.01)

(56) References Cited

U.S. PATENT DOCUMENTS

| | | |
|---|---|---|
| 2007/0066873 A1 | 3/2007 | Kamath et al. |
| 2010/0100337 A1 | 4/2010 | Vichare et al. |
| 2010/0191681 A1 | 7/2010 | Pecht et al. |
| 2011/0218414 A1 | 9/2011 | Kamath et al. |
| 2012/0215491 A1 | 8/2012 | Theriot et al. |
| 2013/0111189 A1 | 5/2013 | Boehl et al. |
| 2014/0118003 A1 | 5/2014 | Chen et al. |
| 2015/0264586 A1* | 9/2015 | Girardeau .............. G01R 23/00 370/252 |
| 2016/0239756 A1* | 8/2016 | Aggour .............. G05B 23/0221 |
| 2018/0284758 A1* | 10/2018 | Cella ....................... G06N 3/088 |
| 2019/0339688 A1* | 11/2019 | Cella .................. G05B 23/0229 |

FOREIGN PATENT DOCUMENTS

| | | |
|---|---|---|
| TW | 200636571 A | 10/2006 |
| TW | 200745879 A | 12/2007 |
| TW | 200817900 A | 4/2008 |
| TW | I463334 B | 12/2014 |
| TW | 201505428 A | 2/2015 |
| TW | I493200 B | 7/2015 |
| TW | 201643746 A | 12/2016 |
| TW | 201719788 A | 6/2017 |
| TW | 201721479 A | 6/2017 |
| TW | 201812576 A | 4/2018 |
| TW | 201828200 A | 8/2018 |

OTHER PUBLICATIONS

Hsieh et al., "VM-Based Baseline Predictive Maintenance Scheme", IEEE Transactions On Semiconductor Manufacturing, Feb. 2013, vol. 26, No. 1, pp. 132-144.

Wang et al., "Feature Extraction Techniques of Non-Stationary Signals for Fault Diagnosis in Machinery Systems", Journal of Signal and Information Processing, 2012, vol. 3, pp. 16-25.

Taiwanese Office Action and Search Report for Taiwanese Application No. 108148346, dated Sep. 18, 2020.

\* cited by examiner

| Cyclic procedures | Processing steps | | | | | | | | | |
|---|---|---|---|---|---|---|---|---|---|---|
| | 1 | 2 | 3 | 4 | 5 | 6 | 7 | 8 | 9 | 10 |
| A | Intake | Vacuum | Discharge | Discharge | Discharge | Discharge | No action | Intake | Intake | Intake |
| B | Discharge | Discharge | No action | Intake | Intake | Intake | Intake | Vacuum | Discharge | Discharge |
| C | No action | Intake | Intake | Intake | Intake | Vacuum | Discharge | Discharge | Discharge | Discharge |
| D | Intake | Intake | Intake | Vacuum | Discharge | Discharge | Discharge | Discharge | No action | Intake |
| E | Discharge | Discharge | Discharge | Discharge | No action | Intake | Intake | Intake | Intake | Vacuum |

FIG. 4

| S(1) | S(2) | S(3) | S(4) | S(5) | S(6) | S(7) | S(8) | S(9) | S(10) |
|---|---|---|---|---|---|---|---|---|---|
| No action | Intake | Intake | Intake | Intake | Vacuum | Discharge | Discharge | Discharge | Discharge |

FIG. 5

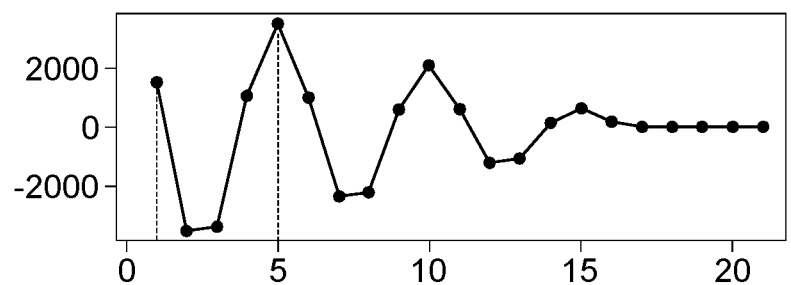
FIG. 9A
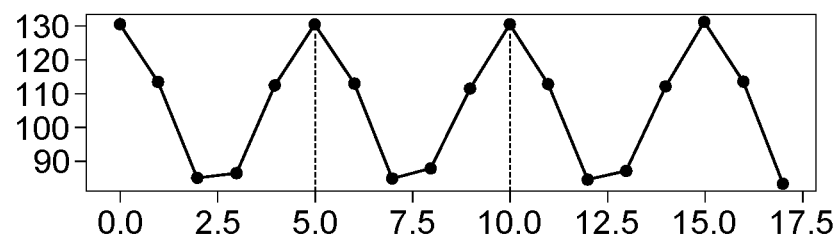
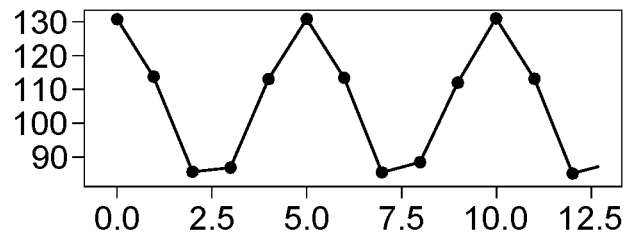
FIG. 9B

| Cyclic procedures | Processing steps | | | | | | | | | |
|---|---|---|---|---|---|---|---|---|---|---|
| | 1 | 2 | 3 | 4 | 5 | 6 | 7 | 8 | 9 | 10 |
| A | Intake | Vacuum | Discharge | Discharge | Discharge | Discharge | No action | Intake | Intake | Intake |
| B | Discharge | Discharge | No action | Intake | Intake | Intake | Intake | Vacuum | Discharge | Discharge |
| C | No action | Intake | Intake | Intake | Intake | Vacuum | Discharge | Discharge | Discharge | Discharge |
| D | Intake | Intake | Intake | Vacuum | Discharge | Discharge | Discharge | Discharge | No action | Intake |
| E | Discharge | Discharge | Discharge | Discharge | No action | Intake | Intake | Intake | Intake | Vacuum |

FIG. 10

DATA PROCESSING SYSTEM AND METHOD

This application claims the benefit of Taiwan application Serial No. 108148346, filed Dec. 30, 2019, the disclosure of which is incorporated by reference herein in its entirety.

TECHNICAL FIELD

The disclosure relates in general to a data processing system and method.

BACKGROUND

With respect to the equipment with few failure events and short life cycle, for example, regenerative thermal oxidizer (RTO), one of the methods adopted in the pre-diagnostic technology is to combine historical baseline data and fresh data to establish or train a failure prediction model. There are two issues to be considered in the pre-diagnostic technology: (1) the data obtained by detecting the machine using a sensor normally contains erroneous information (for example, the machine is in a non-stable state, or has noises, missing data, errors, etc.), which need to be effectively excluded; and (2) the historical data pattern and the recent data pattern need to be aligned, and so are the recent data in different periods. The accuracy of the failure prediction model will be affected if the recent feature parameters captured in different stages are combined with un-aligned historical baseline data. The two issues both will severely affect the accuracy of subsequent pre-diagnosis. Therefore, it has become a prominent task for the industries to effectively tackle with the two issues. Furthermore, such type of equipment has the property of cyclic procedures, but the property of cyclic procedures has not yet been used to resolve the above issues by the present pre-diagnostic technology.

SUMMARY

According to a first aspect of the disclosure, a data processing system, including a cyclic correlation establishing module, a data pattern establishing module, and a data pattern alignment module, is provided. The cyclic correlation establishing module receives a plurality of first sensor data, obtained from a first sensor operation performed on a plurality of processing devices, and receives a table of processing steps and cyclic procedures. The cyclic correlation establishing module obtains a data correlation of the plurality of first sensor data according to the number of sample points in a data cycle of the plurality of first sensor data and the table of processing steps and cyclic procedures to correct the plurality of first sensor data. The data pattern establishing module obtains a plurality of first data pattern features from the plurality of first sensor data. The data pattern alignment module aligns a plurality of second sensor data obtained from a second sensor operation performed on the processing devices with the plurality of first sensor data according to the first data pattern features.

According to a second aspect of the disclosure, a data processing method is provided. The method includes the following steps. A plurality of first sensor data, obtained from a first sensor operation performed on a plurality of processing devices, are received, and a table of processing steps and cyclic procedures are received. The table of processing steps and cyclic procedures records the information of a plurality of processing steps of the processing devices and relevant cyclic operation modes of a plurality of cyclic procedures. A data correlation of the plurality of first sensor data is obtained according to the number of sample points in a data cycle of the plurality of first sensor data and the table of processing steps and cyclic procedures to correct the plurality of first sensor data. A plurality of first data pattern features are obtained according to the plurality of first sensor data. A plurality of second sensor data obtained from a second sensor operation performed on the processing devices are aligned with the plurality of first sensor data according to the first data pattern features.

The above and other aspects of the invention will become better understood with regards to the following detailed description of the preferred but non-limiting embodiment(s). The following description is made with reference to the accompanying drawings.

BRIEF DESCRIPTION OF THE DRAWINGS

FIG. 4 is an example of a table of processing steps and cyclic procedures of the processing devices of FIGS. 3A to 3C.

FIG. 5 is a processing type $S(n)$ performed by 5 cyclic procedures of FIG. 4.

FIG. 9A is a schematic diagram of calculating the number of sample points in a data cycle of the plurality of first sensor data by using an autocorrelation analysis method.

FIG. 9B is a schematic diagram of calculating the number of sample points in a data cycle of the plurality of first sensor data by shifting and matching the data.

FIG. 10 is a schematic diagram of the number of step difference of the cyclic procedures of FIG. 4.

Figure 1:
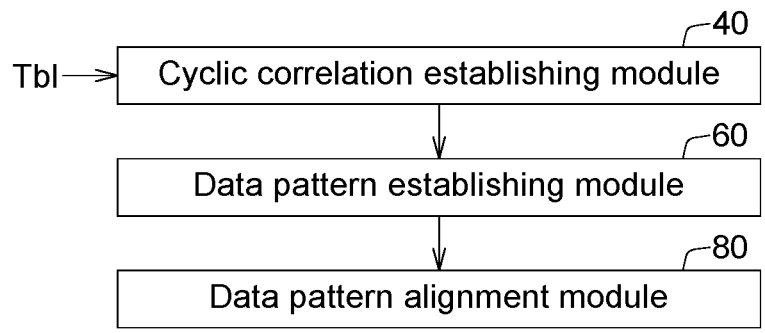
FIG. 1 is a block diagram of a data processing system according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Referring to FIG. 1, a block diagram of a data processing system 10 according to an embodiment of the present disclosure is shown. The data processing system 10 includes a cyclic correlation establishing module 40, a data pattern establishing module 60 and a data pattern alignment module 80. An embodiment of the data processing system 10 is exemplified by a computer system with the software stored in a computer hard disc. The disclosure is not limited thereto. For example, the computer hard disc stores software programming codes whose functions correspond to the functions of the cyclic correlation establishing module 40, the data pattern establishing module 60, and the data pattern alignment module 80. For example, the software programming codes respectively are a cyclic correlation establishing programming code, a data pattern establishing programming code and a data pattern alignment programming code. When the computer processor performs the above programming codes, corresponding functions of the cyclic correlation establishing module 40, the data pattern establishing module 60 and the data pattern alignment module 80 could be implemented. Moreover, corresponding programming codes of the 3 modules could also be implemented by a firmware stored in computer hardware or implemented by an application specific integrated circuit (ASIC). The cyclic correlation establishing module 40 is configured to receive a plurality of first sensor data, obtained from a first sensor operation performed on a plurality of processing devices, and receive a table Tbl of processing steps and cyclic procedures. The cyclic correlation establishing module 40 is further configured to obtain a data correlation of the plurality of first sensor data according to the number of sample points in a data cycle of the plurality of first sensor data and the table Tbl of processing steps and cyclic procedures to correct the plurality of first sensor data. The data pattern establishing module 60 is configured to obtain a plurality of first data pattern features of the plurality of first sensor data. The data pattern alignment module 80 is configured to align a plurality of second sensor data obtained from a second sensor operation performed on a plurality of processing devices with the plurality of first sensor data according to the first data pattern features.

Figure 2:
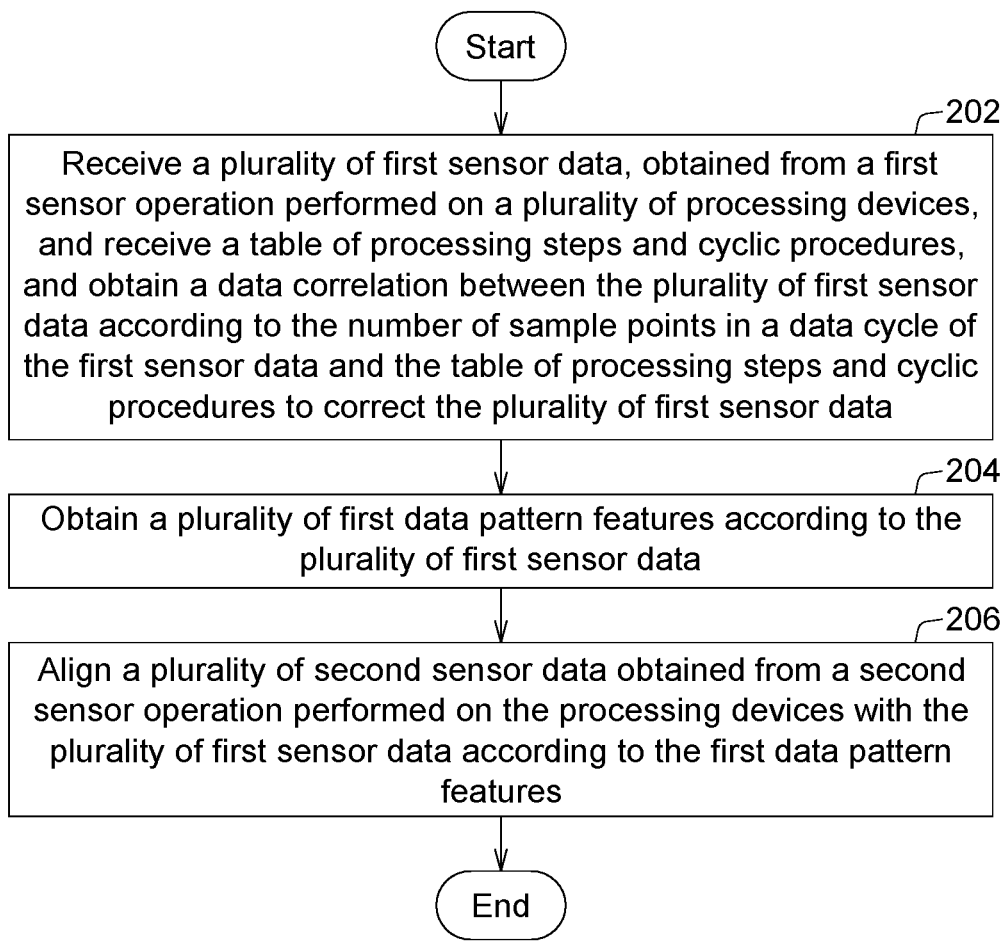
FIG. 2 is a flowchart of a data processing method according to an embodiment of the present disclosure.

Referring to FIG. 2, a flowchart of a data processing method according to an embodiment of the present disclosure is shown. The data processing method includes the following steps. In step 202, a plurality of first sensor data, obtained from a first sensor operation performed on a plurality of processing devices, and a table of processing steps and cyclic procedures are received, and a data correlation of the plurality of first sensor data is obtained according to the number of sample points in a data cycle of the plurality of first sensor data and the table of processing steps and cyclic procedures to correct the plurality of first sensor data. Then, the method proceeds to step 204, a plurality of first data pattern features are obtained according to the plurality of first sensor data. Then, the method proceeds to step 206, a plurality of second sensor data obtained from a second sensor operation performed on the processing devices are aligned with the plurality of first sensor data according to the first data pattern features.

The data processing system 10 may selectively include a monitor, which could be connected to a computer system capable of performing the cyclic correlation establishing programming code, the data pattern establishing programming code and the data pattern alignment programming code, such that the computer becomes an embodiment of the data processing system 10 of the present disclosure. The computer system outputs the results of the 3 programming codes to the monitor to display a graphic user interface (GUI). The graphic user interface is configured to display operating options relevant to the data processing system 10. The operating options are, for example, at least one option relevant to the cyclic operation mode, a table of processing steps and cyclic procedures, a model prediction result or an equipment health indicator. The operating options help the user to operate more conveniently or to more easily understand relevant information, for example, equipment pre-diagnostic result or equipment health indicator. The options include but are not limited to the option of displaying a plurality of first sensor data or second sensor data, the option of displaying the table Tbl of processing steps and cyclic procedures, the option of displaying the data correlation of the plurality of first sensor data, the option of displaying the corrected first sensor data, the option of displaying a plurality of first data pattern features of the plurality of first sensor data, and the option of displaying a plurality of second sensor data aligned with the plurality of first sensor data.

The table Tbl of processing steps and cyclic procedures records the information of relevant cyclic operation modes of a plurality of processing steps of a plurality of processing devices and a plurality of cyclic procedures. In the present disclosure, (1) accuracy of data patterns and (2) the alignment of data patterns are improved through the consideration of the data correlation between the "processing steps" and the "cyclic procedures" of the machine. The improvement on the accuracy of data patterns includes steps (i) and (ii). In step (i), the data correlation between the processing steps and the cyclic procedures is considered, the sampling ratio of the number of processing steps and the number of sample points in a data cycle is obtained, the numbers of step difference of cyclic procedures preformed by the processing device is considered, and the number of shifting data points of the correlated data of the processing devices is calculated (for example, number of shifting data points=(number of step difference)*(sampling ratio)). In step (ii), heterogeneous data patterns are established, the data patterns are captured according to the number of sample points in a data cycle, and the point pattern feature of each sample point is captured and compared through the trend (positive trend or negative trend) of each sample point. The improvement on the alignment of historical baseline data and fresh data includes: obtaining the data patterns of a plurality of second sensor data obtained from a second sensor operation by using a sliding window method, comparing data patterns according to the first data pattern features of the plurality of first sensor data obtained from a first sensor operation, and aligning the plurality of second sensor data with the plurality of first sensor data. Thus, the accuracy of pre-diagnosis could be increased.

Figure 3A:
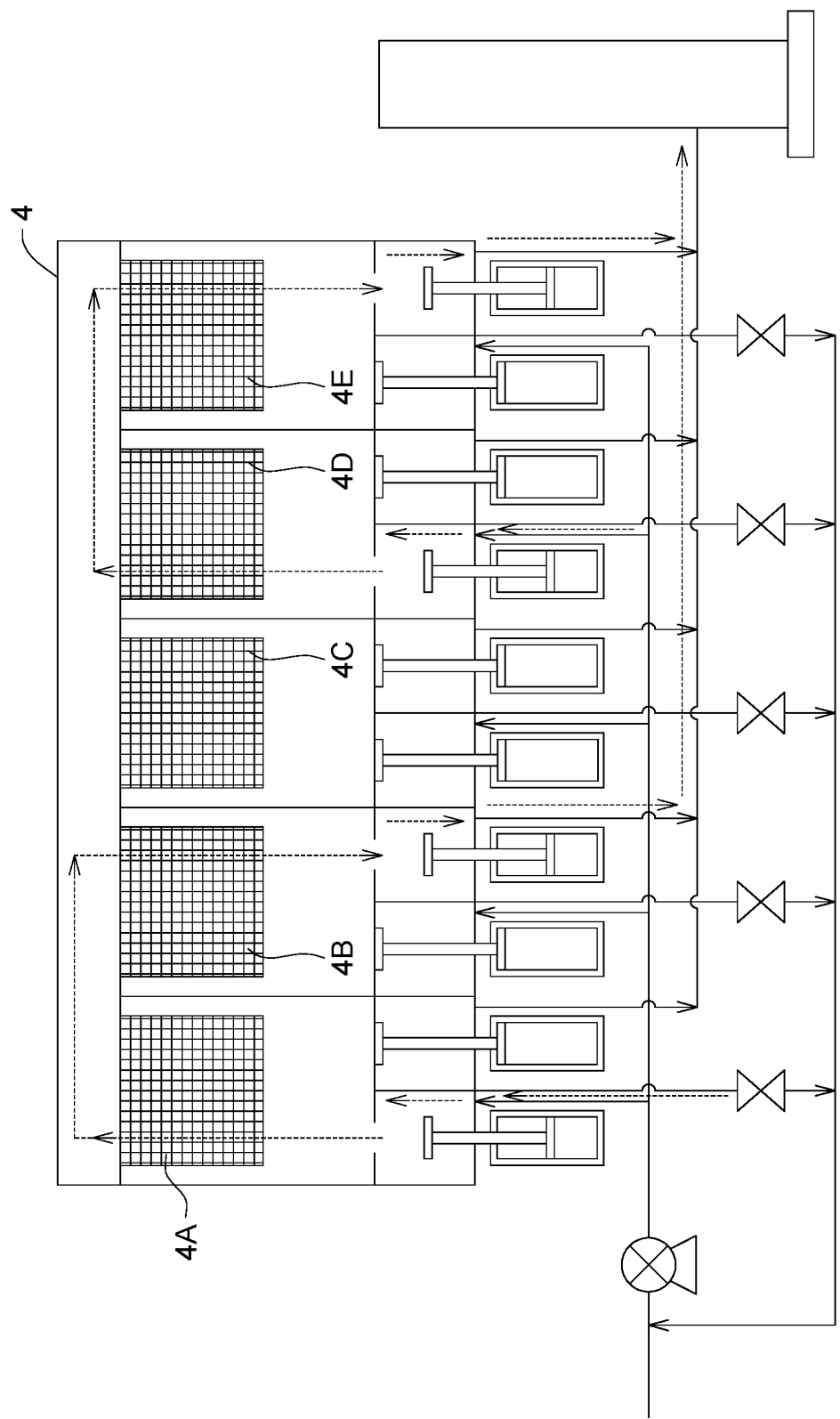
FIG. 3A is an operating state of a multi-device machine in the first stage.
Figure 3B:
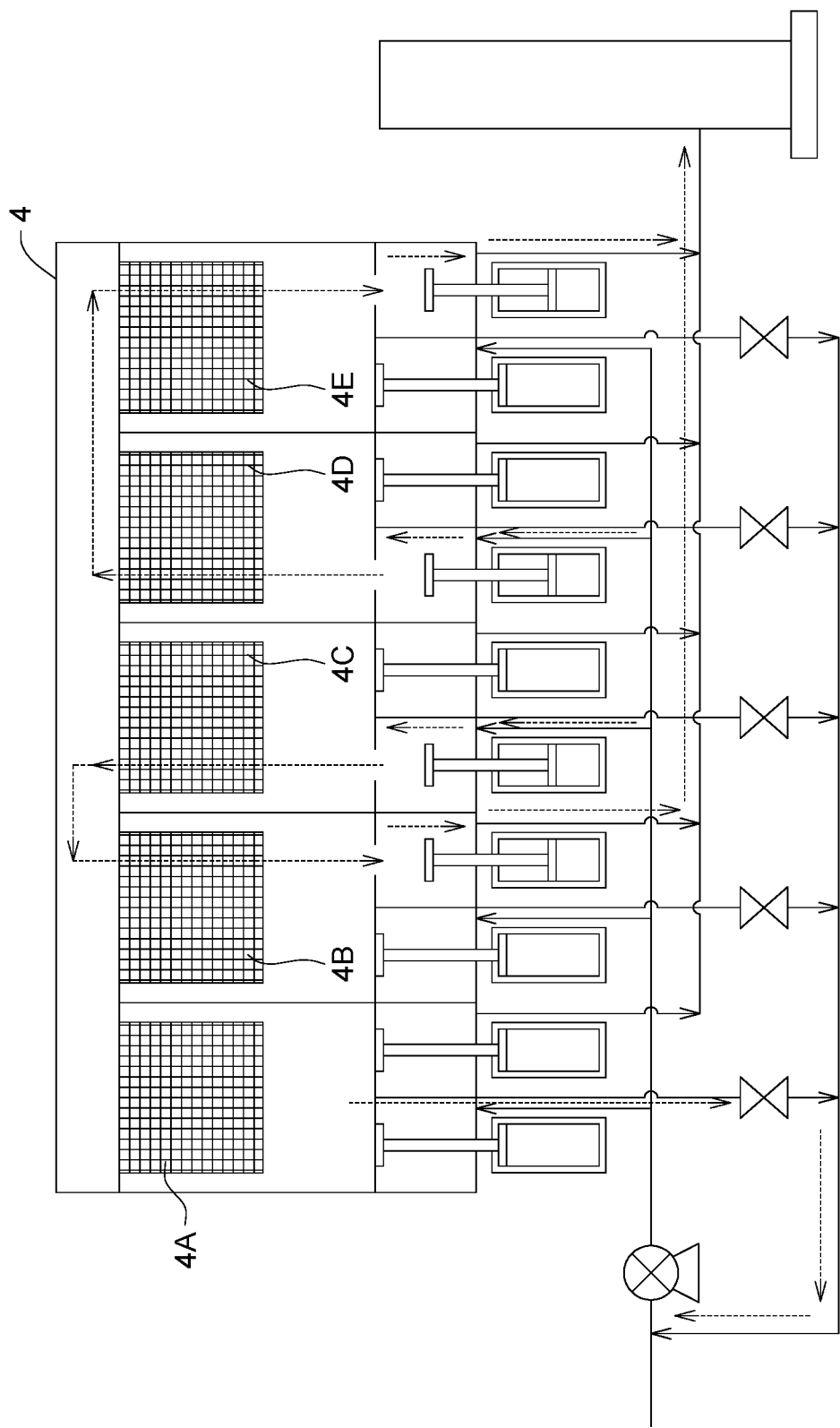
FIG. 3B is an operating state of a multi-device machine in the second stage.
Figure 3C:
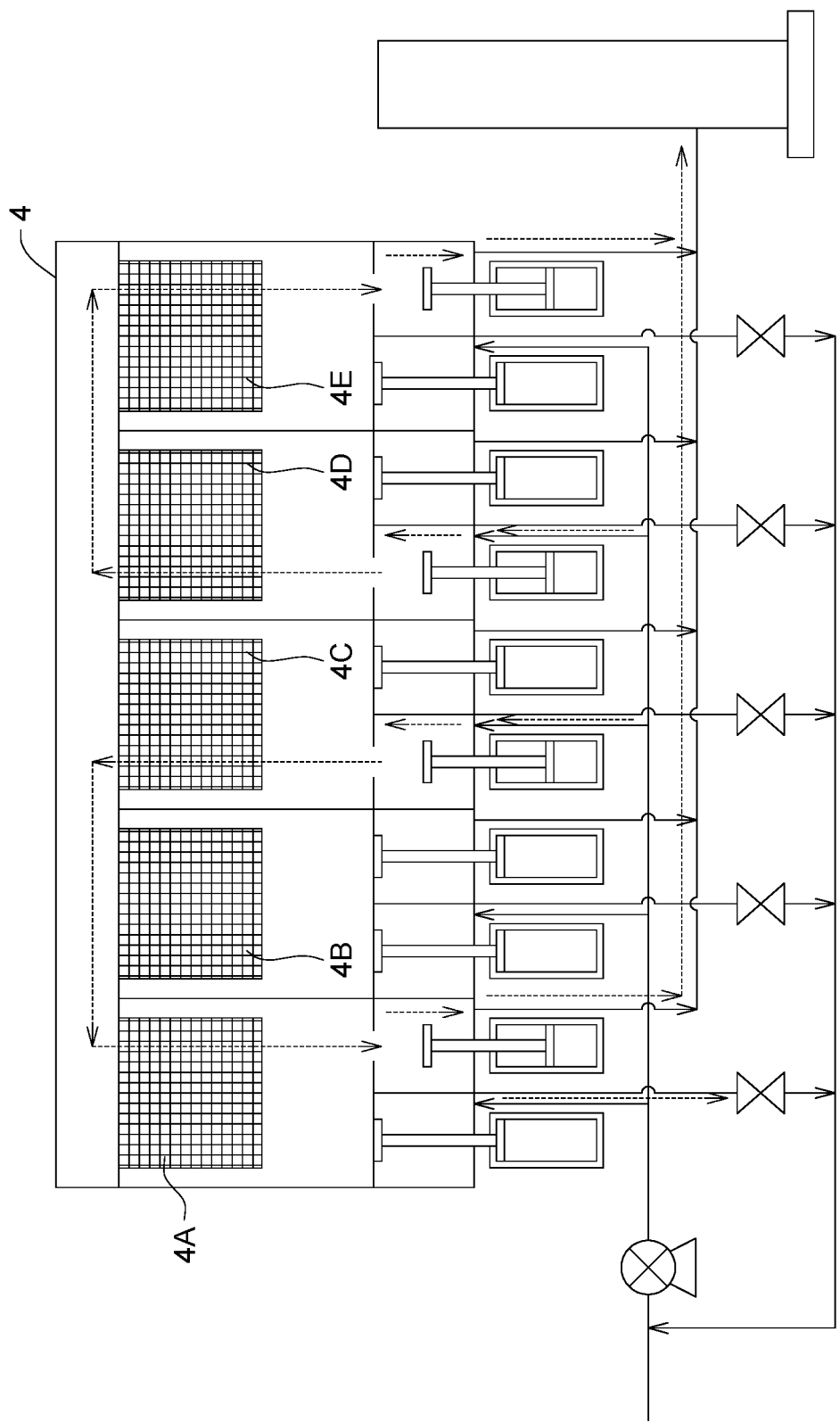
FIG. 3C is an operating state of a multi-device machine in the third stage.

Referring to FIGS. 3A to 3C, schematic diagrams of a multi-device machine 4 in different stages according to an embodiment of the present disclosure are shown. In the present embodiment, the multi-device machine 4 is exemplified by a 5-canister regenerative thermal oxidizer (RTO) machine. The 5-canister regenerative thermal oxidizer machine includes a plurality of heat recovery chambers and corresponding poppet valves, which control the gas flow within the heat recovery chambers. Let the processing device be exemplified by a heat recovery chamber of a 5-canister regenerative thermal oxidizer, but the present embodiment is not limited thereto. The multi-device machine 4 includes a first processing device 4A, a second processing device 4B, a third processing device 4C, a fourth processing device 4D, and a fifth processing device 4E. Referring to FIG. 4, an example of a table Tbl of processing steps and cyclic procedures of the first processing device 4A to the fifth processing device 4E of FIGS. 3A to 3C is shown. Let the table be exemplified by 10 processing steps and 5 cyclic procedures, but the present embodiment is not limited thereto. The table Tbl of processing steps and cyclic procedures records the information of relevant cyclic operation modes with 10 processing steps and 5 cyclic procedures of the first processing device 4A to the fifth processing device 4E. The table Tbl of processing steps and cyclic procedures could be obtained by reading files. The table Tbl of processing steps and cyclic procedures reflects the cyclic operation modes of the physical machine. The first processing device 4A to the fifth processing device 4E respectively perform cyclic procedure A to cyclic procedure E. Each of the cyclic procedures A to E cyclically performs the same sequence of processing steps. That is, the first processing device 4A to the fifth processing device 4E respectively perform the cyclic operation modes, the first processing device 4A repeats the cyclic procedure A, the second processing device 4B repeats the cyclic procedure B, and by the same analogy, the fifth processing device 4E repeats the cyclic procedure E.

Referring to FIG. 5, a processing type S(n) performed by 5 cyclic procedures of FIG. 4 is shown, n=1 to 10. In the present example, the number of processing types is exemplified by 10, but the present embodiment is not limited thereto. Let the sequence of processing steps in the cyclic procedure C be taken for example. The 10 processing types are arranged according to the following sequence: the processing type S(1) is no action; the processing type S(2) is a first stage intake; the processing type S(3) is a second stage intake; the processing type S(4) is a third stage intake; the processing type S(5) is a fourth stage intake; the processing type S(6) is vacuum; the processing type S(7) is a first stage discharge; the processing type S(8) is a second stage discharge; the processing type S(9) is a third stage discharge; the processing type S(10) is a fourth stage discharge. As indicated in FIG. 4, in processing step 1, when the cyclic procedure A performs the processing type S(5) (the fourth stage intake), the cyclic procedure C performs the processing type S(1) (no action), and the cyclic procedure E performs the processing type S(7) (the first stage discharge). The number of step difference between the cyclic procedure A and the cyclic procedure C is: 5−1=4; the number of step difference between the cyclic procedure C and the cyclic procedure E is: 1−7=−6. Since the 10 processing types are repeatedly according to the same sequence, the number of step difference being 4 and the number of step difference being −6 are identical and both are 4.

Refer to FIGS. 3A to 3C and FIG. 4. FIG. 4 further illustrates 3 stages 103, 105 and 107 (respectively corresponding to the processing steps 1, 2, 3) of the multi-device machine 4, which shows the states of the multi-device machine 4 in different stages. The dotted arrows of FIGS. 3A to 3C indicate the circulation directions of the exhaust gas.

As indicated in FIG. 3A, the operation state of the multi-device machine 4 in the first stage 103 is shown. In this state, the first processing device 4A performs step S(5) (the fourth stage intake), the second processing device 4B performs step S(9) (the third stage discharge), the third processing device 4C performs step S(1) (no action), the fourth processing device 4D performs step S(3) (the second stage intake), and the fifth processing device 4E performs step S(7) (the first stage discharge).

As indicated in FIG. 3B, the operation state of the multi-device machine 4 in the second stage 105 is shown. The first processing device 4A performs step S(6) (vacuum), the second processing device 4B performs step S(10) (the fourth stage discharge), the third processing device 4C performs step S(2) (the first stage intake), the fourth processing device 4D performs step S(4) (the third stage intake), the fifth processing device 4E performs step S(8) (the second stage discharge).

As indicated in FIG. 3C, the operation state of the multi-device machine 4 in the third stage 107 is shown. The first processing device 4A performs step S(7) (the first stage discharge), the second processing device 4B performs step S(1) (no action), the third processing device 4C performs step S(3) (the second stage intake), the fourth processing device 4D performs step S(5) (the fourth stage intake), the fifth processing device 4E performs step S(9) (the third stage discharge).

During the intake operation, the exhaust gas flows to the processing device, which makes the exhaust gas combusted and oxidized, and release heat. In the processing device which performs the vacuum operation, the air is introduced to the processing device, and the residual and the exhaust gas not completed combusted are guided to be combusted together. The combusted exhaust gas flows to the other processing device, which performs discharge, to store the heat generated from combustion and discharge the exhaust gas. The operations of intake, vacuum (infuse air or vacuum air) and discharge are correlated. Through the operations of intake, vacuum, and discharge and the cyclic procedures of the processing devices, the thermal energy saving effects, such as high removal rate of exhaust gas and low fuel consumption, could be achieved.

Figure 6:
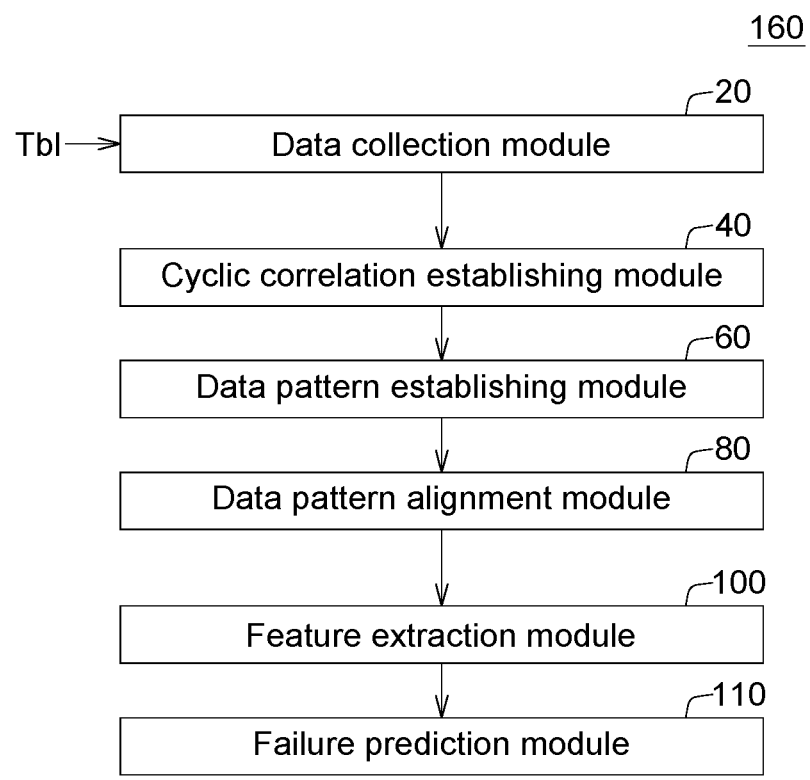
FIG. 6 is a block diagram of a data processing system according to another embodiment of the present disclosure.

Referring to FIG. 6, a block diagram of a data processing system 160 according to another embodiment of the present disclosure is shown. The data processing system 160 could perform pre-diagnosis on the processing devices 4A to 4E. In comparison to the data processing system 10 of FIG. 1, the data processing system 160 further includes a data collection module 20, a feature extraction module 100, and a failure prediction module 110. The cyclic correlation establishing module 40, the data pattern establishing module 60, and the data pattern alignment module 80 of the data processing system 160 are the same with the cyclic correlation establishing module 40, the data pattern establishing module 60, and the data pattern alignment module 80 of the data processing system 10 of FIG. 1, and the similarities are not repeated here.

After the data collection module 20 performs a first sensor operation on the processing devices 4A to 4E, a plurality of first sensor data S_Data1 are obtained, and the plurality of first sensor data S_Data1 are received by the cyclic correlation establishing module 40. The plurality of first sensor data S_Data1 include the first sensor data S_Data1_A of the first processing device 4A, the first sensor data S_Data1_B of the second processing device 4B, the first sensor data S_Data1_C of the third processing device 4C, the first sensor data S_Data1_D of the fourth processing device 4D, and the first sensor data S_Data1_E of the fifth processing device 4E. Then, after the data collection module 20 performs a second sensor operation on the processing devices 4A to 4E, a plurality of second sensor data S_Data2 are obtained, and the plurality of second sensor data S_Data2 are received by the cyclic correlation establishing module 40. The plurality of second sensor data S_Data2 includes the second sensor data S_Data2_A of the first processing device 4A, the second sensor data S_Data2_B of the second processing device 4B, the second sensor data S_Data2_C of the third processing device 4C, the second sensor data S_Data2_D of the fourth processing device 4D, and the second sensor data S_Data2_E of the fifth processing device 4E.

The sensor data, for example, the sensor data of the machine elements of the processing devices, could be obtained by reading files. For example, the sensor data of the machine elements could be obtained by reading files using a data acquisition (DAQ) device or by accessing files from a database system. Examples of the sensor data include temperature of the processing device, round per minute (RPM) of a windmill motor, frequency (Hz), current, bearing vibration, poppet valves switching actions, exhaust gas concentration, exhaust gas flow, combustion engine pressure of the processing device or other parameters for detecting the operating state of the processing device. Let the sensor of a heat recovery chamber of a regenerative thermal oxidizer machine be taken for example. The original sensor data over a period are captured by reading files and are used as a first sensor data mentioned above.

Figure 7:
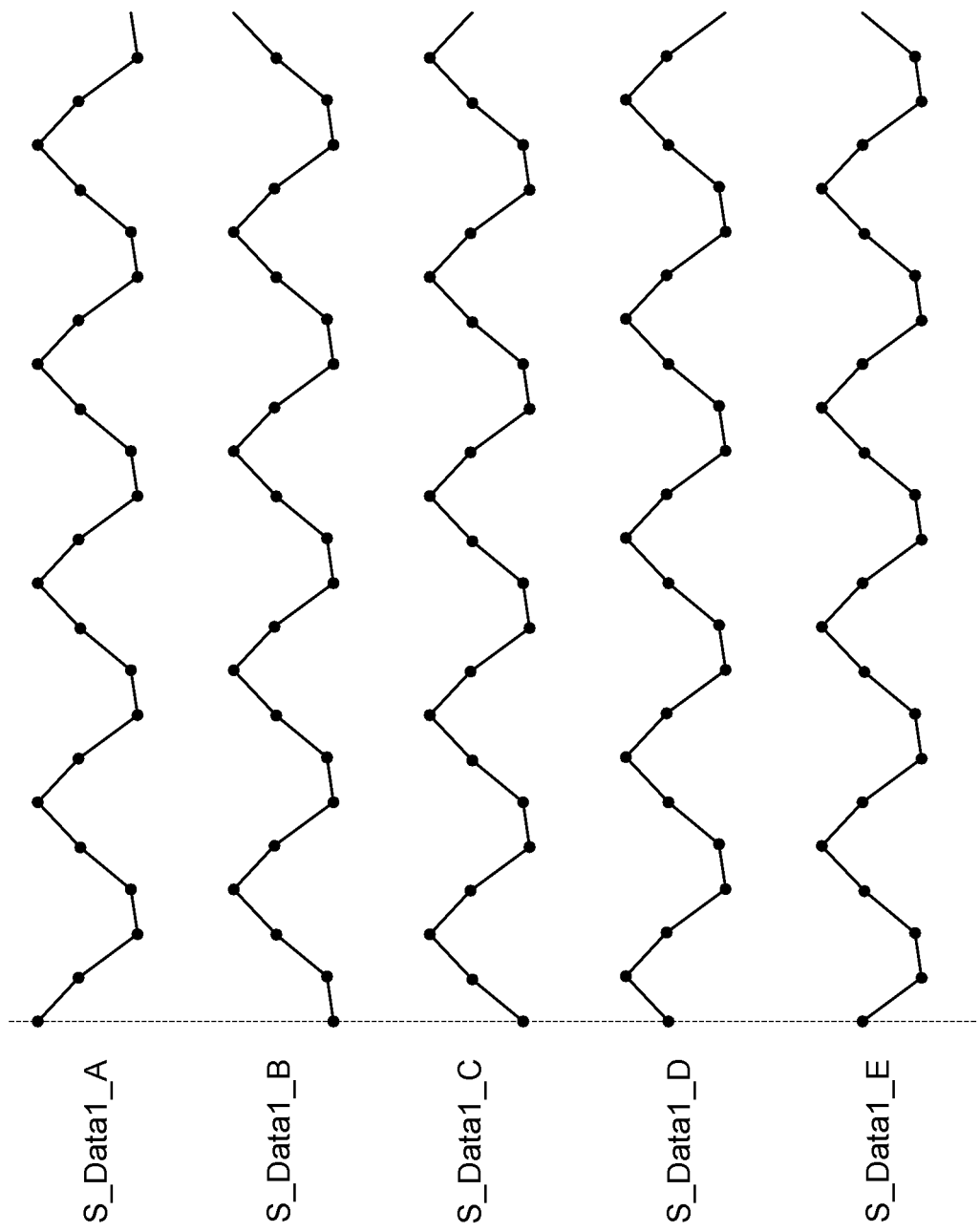
FIG. 7 is a schematic diagram of an example of a plurality of first sensor data obtained from a first sensor operation performed by the data collection module.

Referring to FIG. 7, a schematic diagram of an example of a plurality of first sensor data S_Data1 captured from a first sensor operation performed by the data collection module 20. In a first period, the data collection module 20 generates the first sensor data S_Data1_A of the first processing device 4A after the first processing device 4A cyclically performs the 10 processing steps for several times, generates the first sensor data S_Data1_B of the second processing device 4B after the second processing device 4B cyclically performs the 10 processing steps for several times, and, by the same analogy, generates the first sensor data S_Data1_E of the fifth processing device 4E after the fifth processing device 4E cyclically performs the 10 processing steps for several times.

Figure 8:
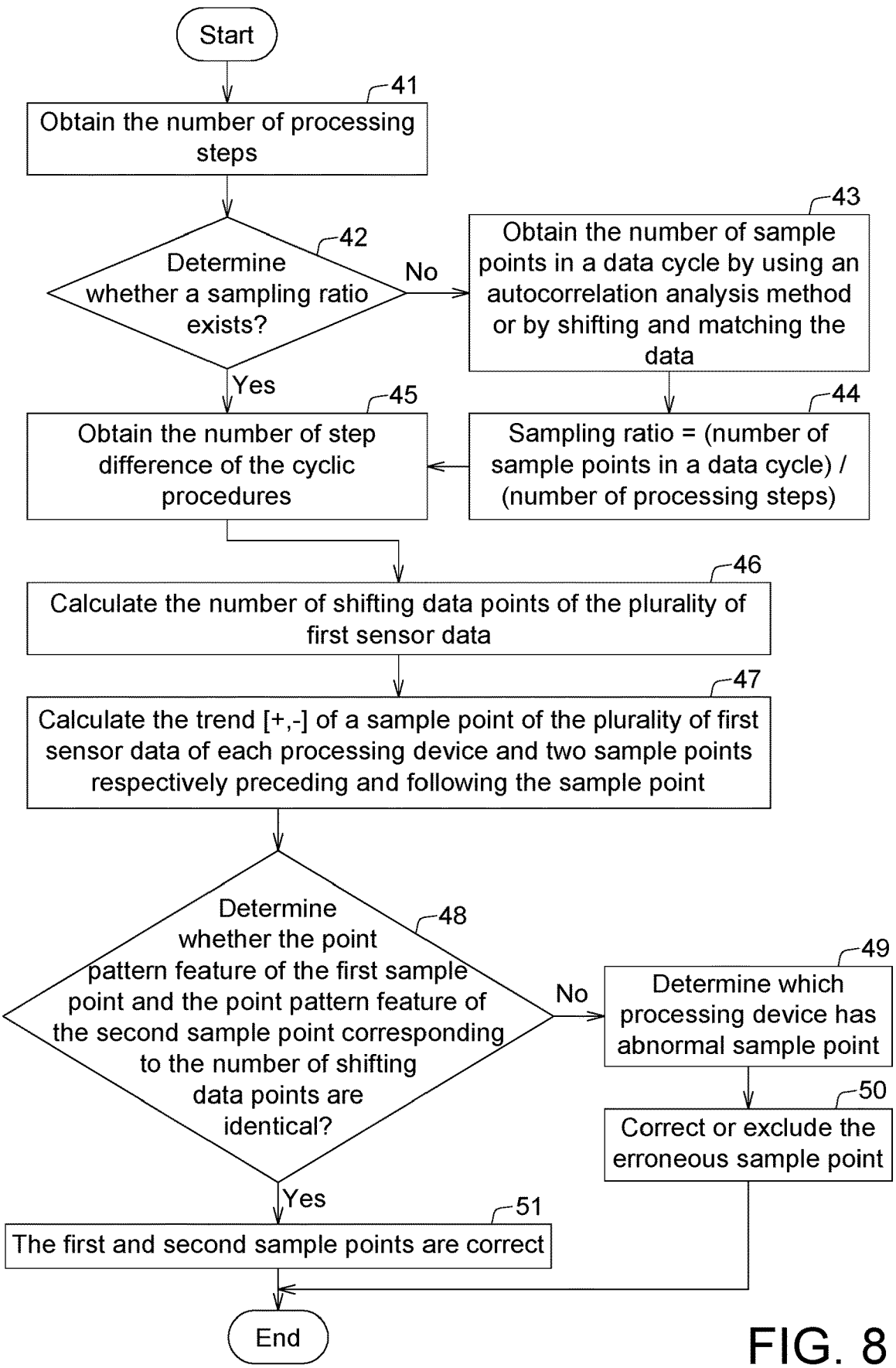
FIG. 8 is a flowchart of an example of the steps performed by a cyclic correlation establishing module.

Referring to FIG. 8, a flowchart of an example of the steps performed by a cyclic correlation establishing module 40 is shown. FIG. 8 illustrates an example of detailed steps of obtaining a data correlation of the plurality of first sensor data by the cyclic correlation establishing module 40 according to the number of sample points in a data cycle of the plurality of first sensor data and the table Tbl of processing steps and cyclic procedures, and correcting the plurality of first sensor data according to data correlation. During the process of correcting the plurality of first sensor data, the cyclic correlation establishing module 40 obtains the number of step difference of the cyclic procedures to obtain a data correlation of the plurality of first sensor data. The data correlation of the plurality of first sensor data includes the number of shifting data points between one of the plurality of first sensor data and another one of the plurality of first sensor data. The cyclic correlation establishing module 40 is further configured to determine data accuracy between the first sample point of one of the plurality of first sensor data and the second sample point of another one of the plurality of first sensor data according to a point pattern feature of a first sample point of one of the plurality of first sensor data and a point pattern feature of a second sample point of another one of the plurality of first sensor data corresponding to the number of shifting data points to correct the plurality of first sensor data. During the process of calculating the data correlation of the plurality of first sensor data, the cyclic correlation establishing module 40 obtains the number of sample points in a data cycle from the plurality of first sensor data by using an autocorrelation analysis method, obtains a sampling ratio of the number of processing steps and the number of sample points in a data cycle, and obtains the number of shifting data points of the plurality of first sensor data according to the sampling ratio to obtain the data correlation of the plurality of first sensor data.

In step 41 of FIG. 8, the number of processing steps is obtained from the table Tbl of processing steps and cyclic procedures by the cyclic correlation establishing module 40 as indicated in FIG. 4. In the present embodiment, each of the cyclic procedures A to E has 10 processing steps. In step 42, whether a sampling ratio exists is determined. When the determination is No, the method proceeds to step 43; when the determination is Yes, the method proceeds to step 45.

In step 43, the number of sample points in a data cycle is obtained from the plurality of first sensor data S_Data1 by using an autocorrelation analysis method and reference is made with FIG. 9A being a schematic diagram of calculating the number of sample points in a data cycle of the plurality of first sensor data S_Data1 by using an autocorrelation analysis method. Referring to FIG. 9B, a schematic diagram of calculating the number of sample points in a data cycle of the plurality of first sensor data S_Data1 by shifting and matching the data is shown. As shown in FIG. 9B, after shifting 5 sample points, the shifted first sensor data S_Data1 (the lower curve of FIG. 9B) matches the original first sensor data S_Data1 (the upper curve of FIG. 9B). Therefore, the number of sample points in a data cycle of the plurality of first sensor data S_Data1 is 5. The number of sample points in a data cycle could be calculated by any of the two methods disclosed above, but the present embodiment is not limited to the two methods.

In step 44, the sampling ratio is obtained according to: (sampling ratio)=(number of sample points in a data cycle)/(number of processing steps), that is, the quotient of the number of sample points in a data cycle divided by the number of processing steps. As indicated in FIG. 9A to 9B, the number of sample points in a data cycle of the plurality of first sensor data S_Data1 calculated by using the autocorrelation analysis method or by shifting and matching the data is 5. Since the number of processing steps calculated in step 41 is 10, the sampling ratio could be calculated as: 5/10=1/2. In an embodiment, the sampling ratio could also be obtained by using a sensor.

In step 45, the number of step difference of the cyclic procedures is confirmed. Referring to FIG. 10, a schematic diagram of the number of step difference of the cyclic procedures of FIG. 4 is shown. FIG. 10 is exemplified by the cyclic procedure A performed by the first processing device 4A, the cyclic procedure C performed by the third processing device 4C, and the cyclic procedure E performed by the fifth processing device 4E. The step difference between the cyclic procedure A performed by the first processing device 4A and the cyclic procedure C performed by the third processing device 4C are 4 steps, and the step difference between the cyclic procedure C performed by the third processing device 4C and the cyclic procedure E performed by the fifth processing device 4E is 4 steps.

In step 46, the number of shifting data points of the plurality of first sensor data S_Data1 is calculated according to number of shifting data points=(number of step difference)*(sampling ratio) to obtain the data correlation. As indicated in FIG. 10, the number of step difference is 4 and the sampling ratio calculated according to step 44 is 1/2. Thus, the number of shifting data points between the first sensor data S_Data1_A of the first processing device 4A and the first sensor data S_Data1_C of the third processing device 4C is calculated as: 4*(1/2)=2, and the number of shifting data points between the first sensor data S_Data1_C of the third processing device 4C and the first sensor data S_Data1_E of the fifth processing device 4E is calculated as: 4*(1/2)=2.

Figure 11:
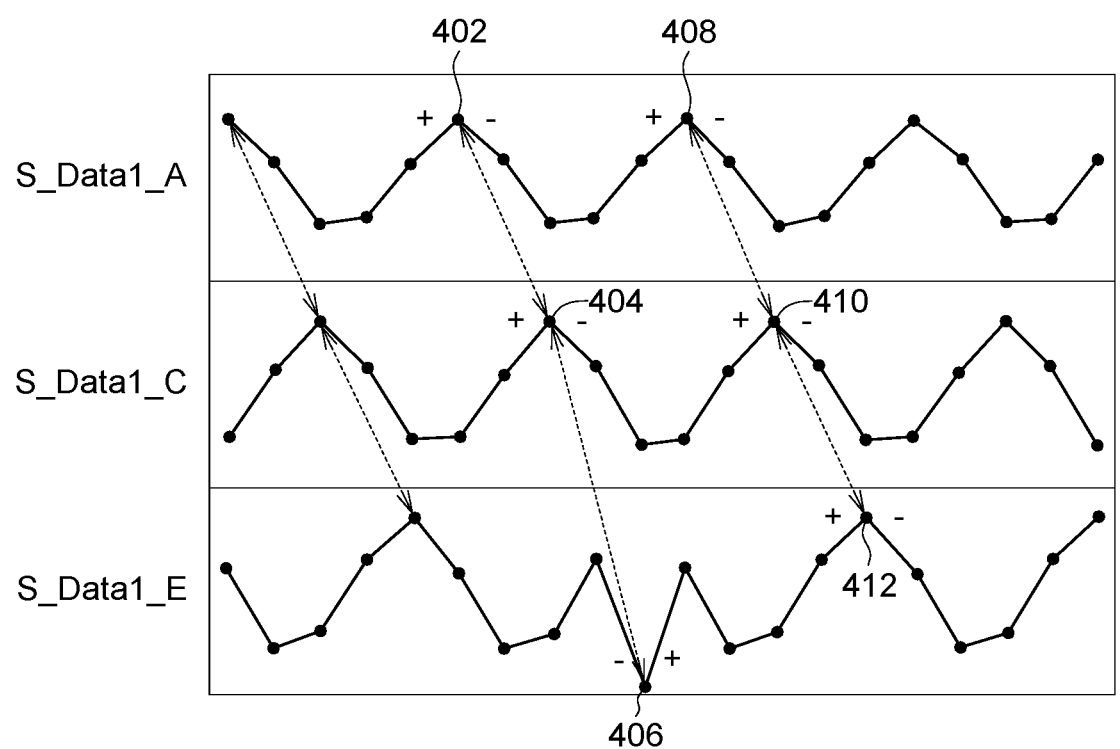
FIG. 11 is a schematic diagram of determining whether the sensor data have abnormal points by the cyclic correlation establishing module of FIG. 1.

In step 47, the trend (positive or negative) of a sample point of the plurality of first sensor data S_Data1 of each processing device and two sample points respectively preceding and following the sample point is calculated. The trend of each sample point of the plurality of first sensor data S_Data1 is calculated. The point pattern feature of a first sample point of one of the plurality of first sensor data S_Data1 is obtained by calculating the trend (positive trend or negative trend) of the first sample point and two sample points respectively preceding and following the first sample point. Referring to FIG. 11, a schematic diagram of determining whether the sensor data have abnormal points by the cyclic correlation establishing module 40 of FIG. 1 is shown. In the first sensor data S_Data1_A of the first processing device 4A, the value of the sample point 408 deducted by a preceding sample point at the left is positive (positive trend), but the value of a following sample point at the right deducted by the sample point 408 is negative (negative trend), therefore the trend between the sample point 408 and two sample points respectively preceding and following the sample point 408 is: [+, −], and is used as the point pattern feature of the sample point 408. In the first sensor data S_Data1_E of the fifth processing device 4E, the value of the sample point 406 deducted by a preceding sample point at the left is negative (negative trend), but the value of a following sample point at the right deducted by the sample point 406 is positive (positive trend), therefore the trend at the sample point 406 and two sample points respectively preceding and following the sample point 406 is: [−, +], and is used as the point pattern feature of the sample point 406. By calculating the trend of a sample point and two sample points respectively preceding and following the sample point, the point pattern feature of each sample point of the first sensor data S_Data1_A of the first processing device 4A to the first sensor data S_Data1_E of the fifth processing device 4E could be calculated.

In step 48, whether the point pattern feature of the first sample point and the point pattern feature of the second sample point corresponding to the number of shifting data points are identical is determined. For example, a sample point of the first sensor data S_Data1_A of the processing device 4A is selected, and a sample point of the first sensor data S_Data1_C of the third processing device 4C and a sample point of the first sensor data S_Data1_E of the fifth processing device 4E are selected by shifting the selected sample point of the first sensor data S_Data1_A of the processing device 4A by the number of shifting data points, and whether the point pattern feature at each sample point is identical is determined. When the point pattern feature at each sample point is identical, then it is determined that no abnormal point exists. When the point pattern feature at a few sample points is inconsistent with the trend at most sample points, then it is determined that abnormal points exist. As indicated in FIG. 11, regarding the cyclic procedure A of the first processing device 4A, the point pattern features at the first sample point 402 and the sixth sample point 408 of the first sensor data S_Data1_A of the first processing device 4A are: [+, −]. Regarding the cyclic procedure C of the third processing device 4C, the point pattern features at the third sample point 404 and the eighth sample point 410 of the first sensor data S_Data1_C of the third processing device 4C are: [+, −]. Regarding the cyclic procedure E of the fifth processing device 4E, the point pattern features at the fifth sample point 406 of the first sensor data S_Data1_E of the fifth processing device 4E is: [−, +], and the point pattern feature at the tenth sample point 412 of the first sensor data S_Data1_E of the fifth processing device 4E is: [+, −]. The rule that most sample points are normal and only a few sample points are abnormal is applied. In step 48, the first sample point 402 and the sixth sample point 408 of the first sensor data S_Data1_A of the first processing device 4A, the third sample point 404 and the eighth sample point 410 of the first sensor data S_Data1_C of the third processing device 4C, and the tenth sample point 412 of the first sensor data S_Data1_E of the fifth processing device 4E are all determined as normal sample points according to the point pattern feature at the majority of sample points, but the fifth sample point 406 of the first sensor data S_Data1_E of the fifth processing device 4E is determined as an abnormal point under the rule that most sample points are normal and only a few sample points are abnormal. That is, the first sensor data S_Data1_A of the processing device 4A and the first sensor data S_Data1_C of the third processing device 4C do not have abnormal points, but the first sensor data S_Data1_E of the fifth processing device 4E has an abnormal point 406. Thus, it can be achieved that data accuracy between the first sample point (for example, the sample point 402 or 404) of one of the plurality of first sensor data and the second sample point (for example, the sample point 406) of another one of the plurality of first sensor data is determined according to the point pattern feature of a first sample point (for example, the sample point 402 or 404) of one of the plurality of first sensor data (for example, the first sensor data S_Data1_A of the first processing device 4A or the first sensor data S_Data1_C of the third processing device 4C) and the point pattern feature of a second sample point (for example, the sample point 406) of another one of the plurality of first sensor data (for example, the first sensor data S_Data1_E of the fifth processing device 4E).

In steps 49 and 50, after which processing device has abnormal sample point is determined, the erroneous sample point is corrected or excluded. For example, in FIG. 11, the fifth sample point 406 of the first sensor data S_Data1_E of the fifth processing device 4E, which has been determined as an abnormal point, could be excluded and not included in subsequent calculation or could be corrected with reference to the sample point 402 and 404 to obtain a corrected first sensor data S_Data1_E' of the fifth processing device 4E. When the determination of step 48 is Yes, step 51 is entered. In step 51, it is determined the first sample point and the second sample point are correct. After step 50 and step 51, correct sample points or corrected error sample points, for example, the corrected first sensor data S_Data1_E' of the fifth processing device 4E, are collected by the cyclic correlation establishing module 40.

Figure 12:
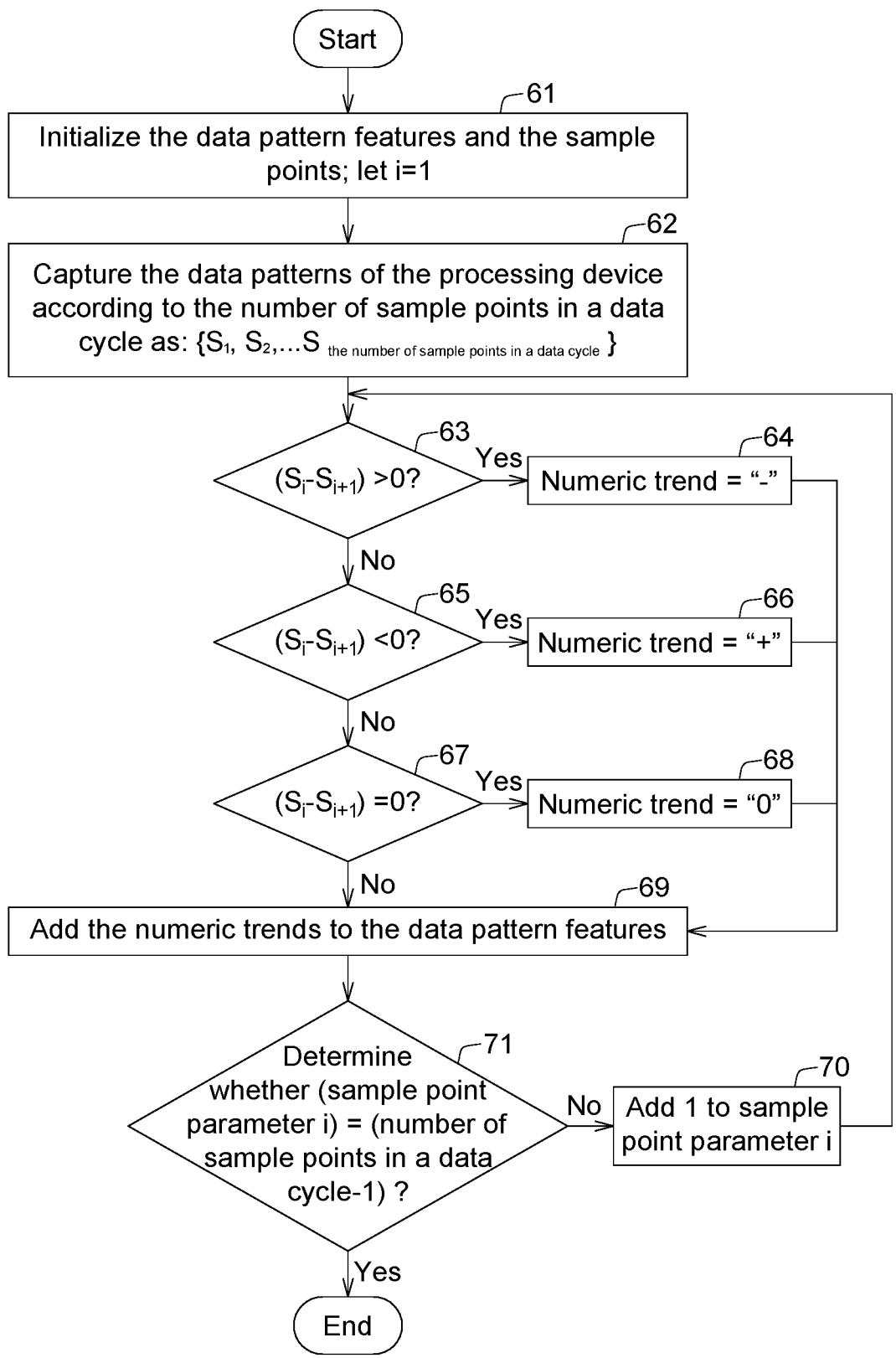
FIG. 12 is a flowchart of an example of detailed steps performed by the data pattern establishing module of FIG. 1 or FIG. 6.

Referring to FIG. 12, a flowchart of an example of detailed steps performed by the data pattern establishing module 60 of FIG. 1 or FIG. 6 is shown. In FIG. 12, the steps of obtaining the first data pattern features by the data pattern establishing module 60 according to the plurality of first sensor data S_Data1 include: capturing a plurality of data patterns of the plurality of first sensor data S_Data1 according to the number of sample points in a data cycle to obtain the first data pattern features of the plurality of first sensor data S_Data1. The data patterns are obtained by calculating the trend (positive or negative) at a plurality of sample points of the plurality of first sensor data S_Data1. For example, the first data pattern features of the first sensor data S_Data1_A to S_Data1_E are respectively obtained according to the first sensor data S_Data1_A of the processing device 4A to the first sensor data S_Data1_D of the fourth processing device 4D and the first sensor data S_Data1_E of the fifth processing device 4E which has been corrected by excluding abnormal points.

In step 61 of FIG. 12, the data pattern features and the sample points are initialized; let i=1, i is a positive integer. In step 62, the data patterns of the processing device are captured according to the number of sample points in a data cycle as: $\{S_1, S_2, \ldots S_{the\ number\ of\ sample\ points\ in\ a\ data\ cycle}\}$, wherein the value of each of the sample points $S_1, S_2, \ldots$ is a real number. In the present embodiment, the number of sample points in a data cycle is 5, therefore $\{S_1, S_2, \ldots S_5\}$ are sampled.

Figure 13:
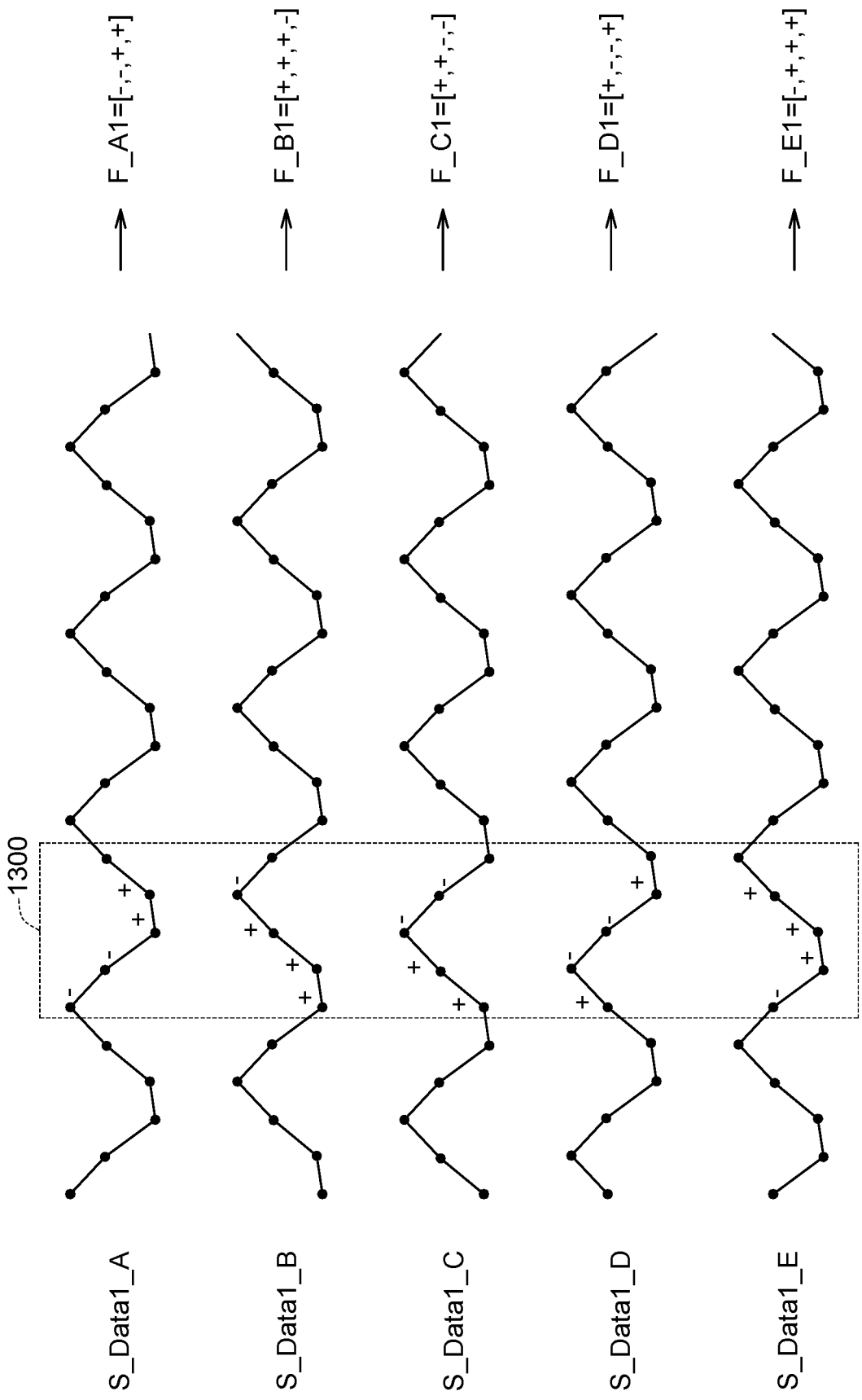
FIG. 13 is a schematic diagram of obtaining data pattern features of the plurality of first sensor data.

In steps 63 to 64, when $(S_i - S_{i+1}) > 0$, then the numeric trend is determined as: "−". In step 65 to 66, when $(S_i - S_{i+1}) < 0$, then the numeric trend is determined as: "+". In step 67 to 68, when $(S_i - S_{i+1}) = 0$, then the numeric trend is determined as: "0". In step 69, the numeric trends are added to the data pattern features of the corresponding processing device one by one. In step 71, whether sample point parameter i equal to the number of sample points in a data cycle minus 1 is determined. When the determination is No, step 70 is entered. In step 70, 1 is added to the value of the sample point parameter i, the window continues to move rightward by one sample point, and the loop is repeated until the analysis of the numeric trend at 5 sample points of each of the plurality of first sensor data is completed. Here, the numeric trend is exemplified by a line segment slope, but the present disclosure is not limited thereto. For example, the numeric trend could also be a rise and fall feature. Refer to FIG. 13. 5 sample points are taken from each of the plurality of first sensor data S_Data1, and 4 numeric trends are respectively obtained by deducting the value of each sample point by the value of a following sample point and the 4 numeric trends are used as corresponding data pattern features. In the present embodiment, based on the plurality of first sensor data S_Data1 of FIG. 7, the data pattern feature of each of the plurality of first sensor data corresponding to the block 1300 of FIG. 13 could be obtained. For example, the data pattern feature of the first sensor data S_Data1_A corresponding to the cyclic procedure A of the first processing device 4A is: F_A1=[−, −, +, +]; the data pattern feature of the first sensor data S_Data1_B corresponding to the cyclic procedure B of the second processing device 4B is: F_B1=[+, +, +, −]; the data pattern feature of the first sensor data S_Data1_C corresponding to the cyclic procedure C of the third processing device 4C is: F_C1=[+, +, −, −]; the data pattern feature of the first sensor data S_Data1_D corresponding to the cyclic procedure D of the fourth processing device 4D is: F_D1=[+, −, −, +]; the data pattern feature of the first sensor data S_Data1_E corresponding to the cyclic procedure E of the fifth processing device 4E is: F_E1=[−, +, +, +]. Thus, the data pattern establishing module 60 obtains each first data pattern feature of each of the plurality of first sensor data according to 5 first sensor data S_Data1_A to S_Data1_E.

Figure 14:
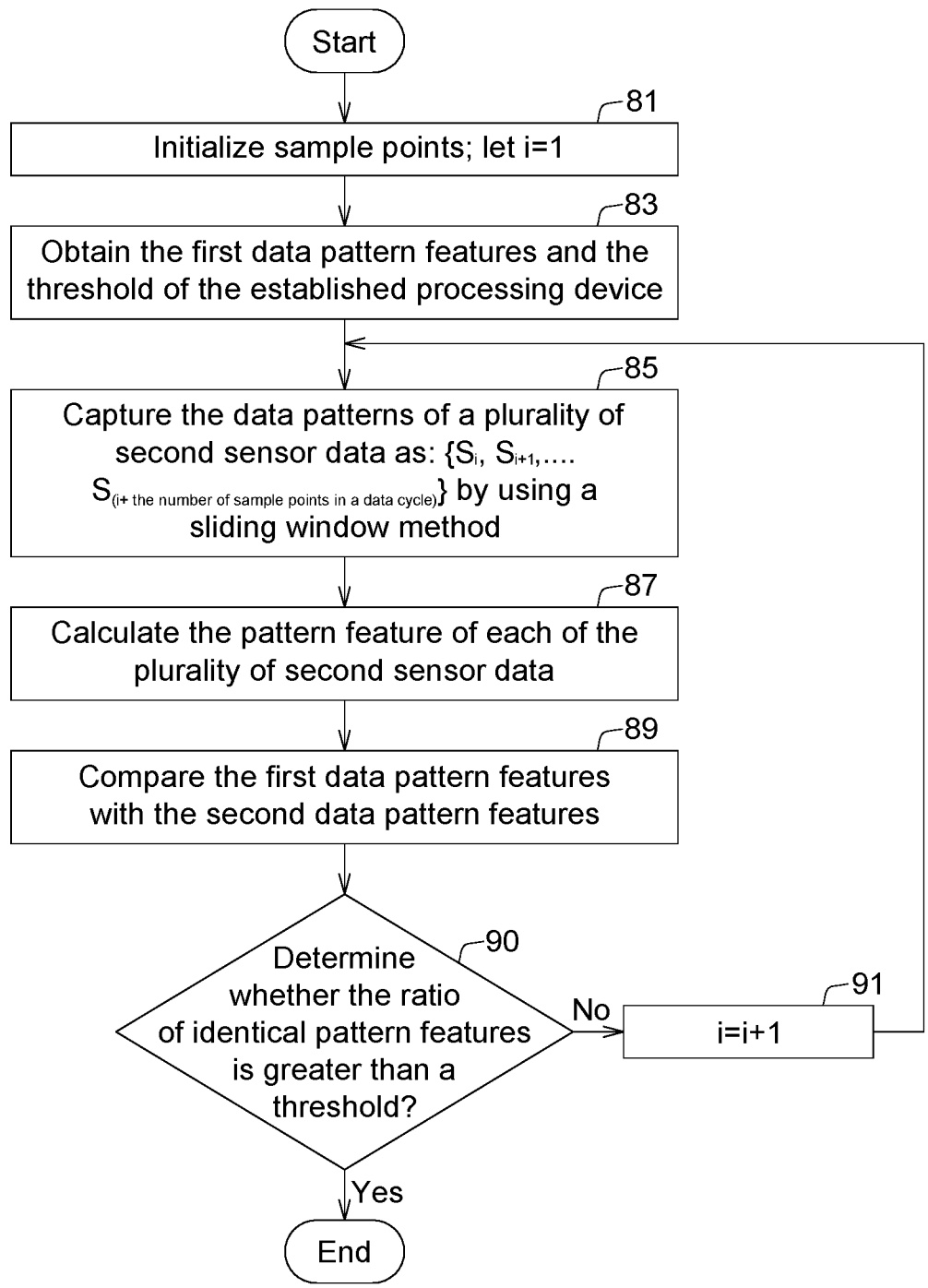
FIG. 14 is a flowchart of an example of detailed steps performed by the data pattern alignment module.

Referring to FIG. 14, a flowchart of an example of detailed steps performed by the data pattern alignment module 80 is shown. FIG. 14 illustrates an example of detailed steps of aligning a plurality of second sensor data S_Data2 obtained from a second sensor operation performed on the processing devices 4A to 4E with the plurality of first sensor data S_Data1 by the data pattern alignment module 80 according to the first data pattern features. The data pattern alignment module 80 captures a plurality of second data pattern of the plurality of second sensor data S_Data2 by using a sliding window method, obtains a plurality of second data pattern features of the second data patterns, and compares the second data pattern features with the first data pattern features corresponding to the second data pattern features. When the similarity between the second data pattern features and the first data pattern features corresponding to the second data pattern features is greater than a threshold, it is determined that the second data patterns are aligned with the corresponding first data patterns.

In steps 81 to 83 of FIG. 14, the sample points are initialized, let i=1, and the first data pattern features and the threshold of the established processing device are obtained, wherein i is a positive integer. In step 85, the data patterns of a plurality of second sensor data are captured as: $\{S_i, S_{i+1}, \ldots S_{i+the\ number\ of\ sample\ points\ in\ a\ data\ cycle}\}$ by using a sliding window method. In step 87, the pattern feature of each of the plurality of second sensor data is calculated to obtain a plurality of second data pattern features. In step 89, the first data pattern features are compared with the second data pattern features. In step 90, whether the ratio of identical pattern features is greater than a threshold is determined. When the determination is Yes, then it is determined that the aligned part has been found. When the determination is No, the method proceeds to step 91. In step 91, 1 is added to the value of the sample point parameter i, and the window continues to move rightward by a sample point.

Figure 15:
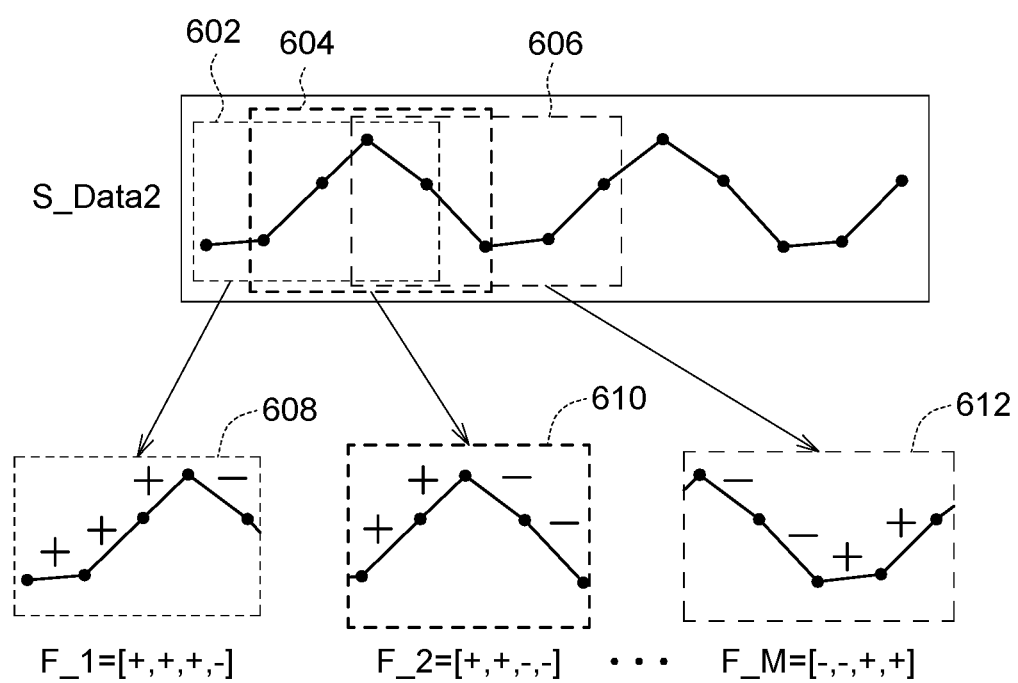
FIG. 15 is a schematic diagram of a plurality of second data pattern features captured from different parts of anyone of the plurality of second sensor data by using a sliding window method.

Referring to FIG. 15, a schematic diagram of step 85 of capturing a plurality of second data pattern features from different parts of anyone of the plurality of second sensor data S_Data2 using a sliding window method is shown. The second data pattern features of the data patterns 608, 610, and 612 respectively captured from the windows 602, 604, and 606 at different positions are: F_1=[+, +, +, −], F_2=[+, +, −, −] and F_M=[−, −, +, +].

Figure 16:
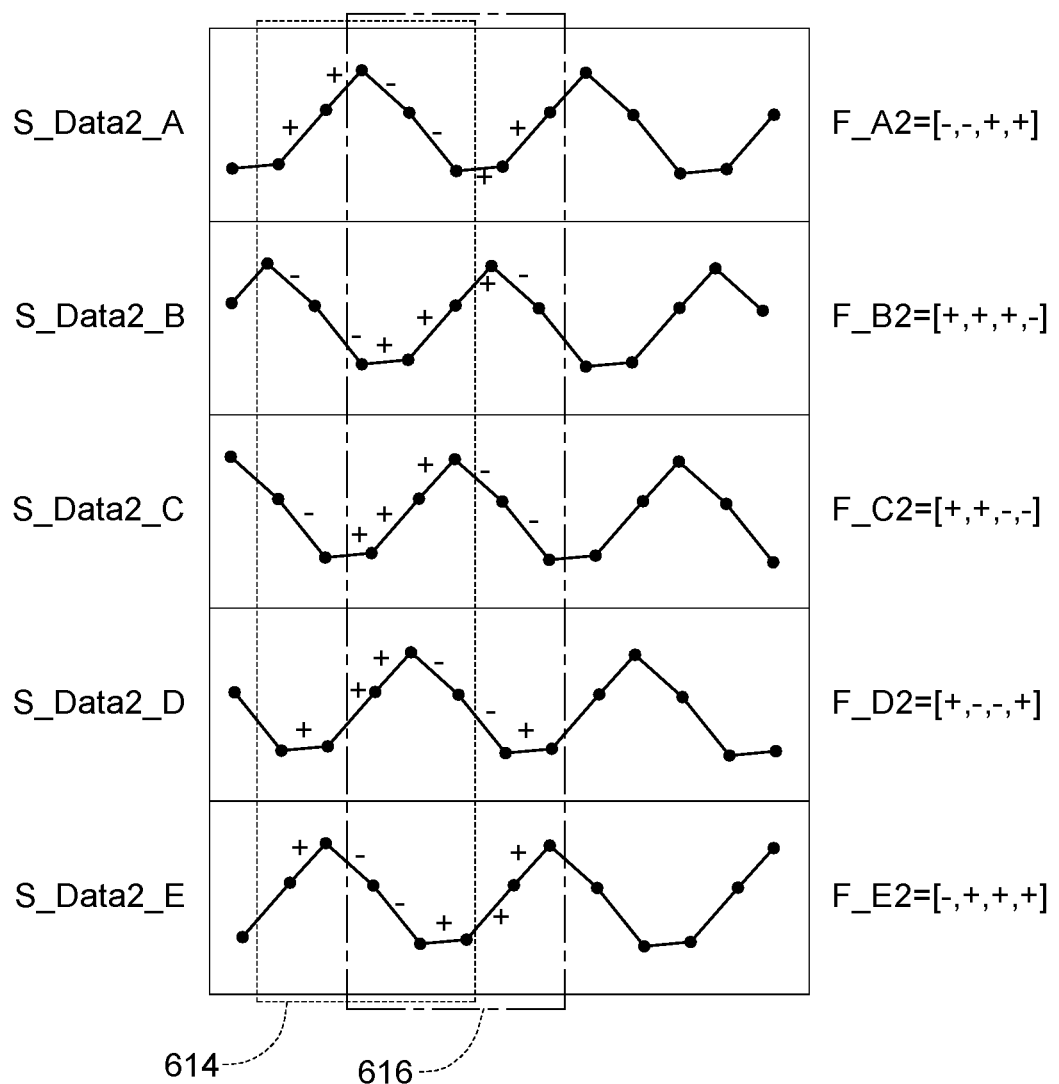
FIG. 16 is a schematic diagram of capturing different parts of the plurality of second sensor data by using a sliding window method.

Referring to FIG. 16, a schematic diagram of step 90 of capturing different parts of the plurality of second sensor data S_Data2 using a sliding window method is shown. During the process of sliding the window, for the data pattern alignment module 80 to determine that the second data patterns are aligned with the corresponding first data patterns, the window must be slid until the similarities between the 5 second data pattern features of the plurality of second sensor data S_Data2 and the corresponding 5 first data pattern features respectively are greater than a threshold, for example, 80% to 90%. As indicated in FIG. 16, in response to the 5 data patterns of the 5 second sensor data captured from the window 614, the second data pattern feature of the second sensor data S_Data2_A of the first processing device 4A is: [+, +, −, −]; the second data pattern feature of the second sensor data S_Data2_B of the second processing device 4B is: [−, −, +, +]; and by the same analogy, the second data pattern feature of the second sensor data S_Data2_E of the fifth processing device 4E is: [+, −, −, +]. Since the second data pattern features of FIG. 16 are not similar to the first data pattern features of FIG. 13, it could be concluded that the 5 data patterns of the 5 second sensor data captured from the window 614 are not aligned with the 5 data patterns of the 5 first sensor data captured from the block 1300 of FIG. 13.

When the sliding window is a window 616, the data pattern features are calculated from the first line segment slope completely covered by the window 616. The second data pattern feature F_A2 of the second sensor data S_Data2_A of the first processing device 4A is: [−, −, +, +]; the second data pattern feature F_B2 of the second sensor data S_Data2_B of the second processing device 4B is: [+, +, +, −]; and by the same analogy, the second data pattern feature F_E2 of the second sensor data S_Data2_E of the fifth processing device 4E is: [−, +, +, +]. Thus, the part of the plurality of second sensor data S_Data2 which is correctly aligned with the plurality of first sensor data S_Data1 has been found since the similarity between the 5 second data pattern features corresponding to the window 616 and the 5 corresponding first data pattern features of FIG. 13 is greater than a threshold (for example, the values of the data pattern feature F_A2 to F_E2 corresponding to the window 616 of FIG. 16 are respectively identical to the values of data pattern feature F_A1 to F_E1 corresponding to the block 1300 of FIG. 13). That is, the part of the plurality of second sensor data S_Data2 indicated by the window 616 of FIG. 16 could be aligned with the part of the plurality of first sensor data S_Data1 indicated by the dotted block 1300 of FIG. 13. The part of the plurality of second sensor data S_Data2 indicated by the window 614 of FIG. 16 is regarded as not aligned with the part of the plurality of first sensor data S_Data1 indicated by the dotted block 1300 of FIG. 13.

As indicated in FIG. 6, the data processing system 160 further includes a feature extraction module 100 configured to obtain a plurality of first feature parameters of the plurality of first sensor data S_Data1 and a plurality of second feature parameters of the plurality of second sensor data S_Data2 which are aligned with the plurality of first sensor data S_Data1, and combine the first feature parameters and the second feature parameters.

Figure 17:
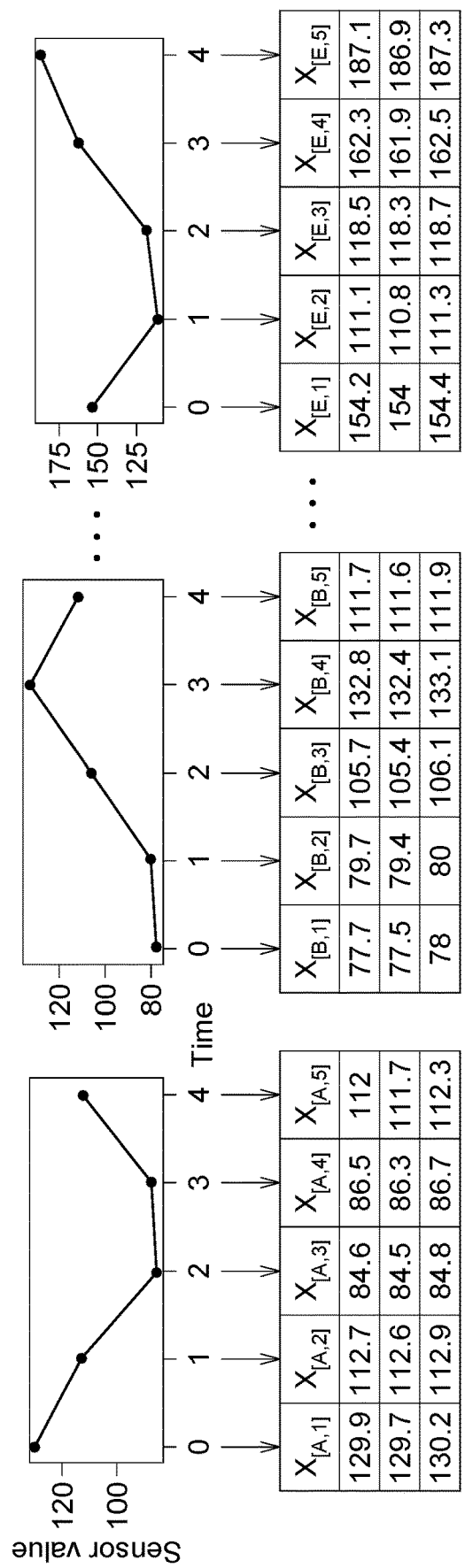
FIG. 17 is a schematic diagram of extracting the feature parameters of each processing device by a feature extraction module according to data patterns.

Referring to FIG. 17, a schematic diagram of extracting the feature parameters of each processing device by a feature extraction module 100 according to data patterns is shown. The present embodiment is exemplified by 5 processing devices 4A to 4E, but the present embodiment is not limited thereto. As indicated in FIG. 17, a plurality of sets of feature parameters $X_{[A,1]}$ to $X_{[A,5]}$ of the first processing device 4A, a plurality of sets of feature parameters $X_{[B,1]}$ to $X_{[B,5]}$ of the second processing device 4B, and by the same analogy, a plurality of sets of feature parameters $X_{[E,1]}$ to $X_{[E,5]}$ of the fifth processing device 4E are extracted. The feature parameters are, for example, the sensor values cyclically captured from a specific window. For example, the first 100 sets of data $X_{[A,1]}$ to $X_{[E,5]}$ are the 100 sets of sensor values captured from the block 1300 of FIG. 13, and other 50 sets of data $X_{[A,1]}$ to $X_{[E,5]}$ are the 50 sets of sensor values captured from the window 616 of FIG. 16. For example, in the first set of data pattern $X_{[A,1]}$ to $X_{[E,5]}$ illustrated in the first row of FIG. 17, the values of $X_{[A,1]}$ to $X_{[A,5]}$ are [129.9, 112.7, 84.6, 56.5, 112] corresponding to the values of the first sensor data S_Data1_A captured from the block 1300 of FIG. 13, and the values of $X_{[B,1]}$ to $X_{[B,5]}$ are [77.7, 79.7, 105.7, 132.8, 111.7] corresponding to the values of the first sensor data S_Data1_B captured from the block 1300 of FIG. 13, and by the same analogy, the values of $X_{[E,1]}$ to $X_{[E,5]}$ are [154.2, 111.1, 118.5, 162.3, 187.1] corresponding to the values of the first sensor data S_Data1_E obtained from the block 1300 of FIG. 13. Thus, firstly, a 1*25 matrix of a first data set is obtained by combining the columns. Then, the $2^{nd}$ to the 100-th sets of sensor values are captured from the block 1300 of FIG. 13. Then, 50 sets of sensor values are obtained from the window 616 of FIG. 16. The 100 sets of sensor values captured from the block 1300 of FIG. 13 (corresponding to the plurality of first sensor data S_Data1) are combined with the 50 sets of sensor values obtained from the window 616 of FIG. 16 (corresponding to the plurality of second sensor data S_Data2) to form a 150*25 matrix. A plurality of first feature parameters and a plurality of second feature parameters are respectively extracted from the plurality of first sensor data S_Data1 and the plurality of second sensor data S_Data2, and respective corresponding feature parameters are combined. Each time when the data processing system 160 performs a window capture operation on the 5 processing devices 4A to 4E, each processing device obtains 5 updated feature parameters, and 5 processing device obtains 25 updated feature parameters in total. The feature extraction module 100 continues to combine the columns to obtain a new data set (1 row*25 columns) used as testing data for follow-up step.

As indicated in FIG. 6, the data processing system 160 further includes a failure prediction module 110 configured to perform prediction model training to construct a failure prediction model according to the combined samples (for example, the first sample sets and the second sample sets aligned with the first sample sets) and the feature parameter module (1 row*25 columns) obtained from the combined columns, and perform failure prediction by using a plurality of third feature parameters extracted from a testing data according to the failure prediction model. The failure prediction module 110 participates in training the failure prediction model according to the first feature parameters and the second feature parameters outputted from the feature extraction module 100. Then, the failure prediction module 110 could predict the failure of the processing devices 4A to 4E according to the trained failure prediction model. The failure prediction module 110 could use the feature parameters outputted through relevant operations of FIGS. 8 to 16 as a training data to train the failure prediction model through machine learning. The failure prediction module 110 could input the testing data to the failure prediction model to predict failure events and accordingly output a health state indicator of the equipment and provide a warning. The testing data includes a plurality of third feature parameters corresponding to a third sensor data obtained from the normal operations of the processing devices 4A to 4E after the training of the failure prediction model is completed. The third feature parameters are the sensor values of the third sensor data cyclically captured from a specific window. The waveform of the third sensor data is similar to the waveform of the plurality of first sensor data S_Data1 of FIG. 13 or the waveform of the plurality of second sensor data S_Data2 of FIG. 16. Here, the testing data could be obtained by the same method for extracting the features of the model establishing data except that the extracting period is different. The testing data does not need to be processed by the cyclic correlation establishing module, the data pattern establishing module, or the data pattern alignment module. After receiving the testing data from the data collection module, the feature extraction module could capture 1 set of testing data, and further input the set of testing data to the failure prediction module to perform failure prediction. The machine learning training model mentioned above could be self organizing map (SOM) model, or other machine learning training models of the same type, for example, density-based anomaly detection model, or clustering-based anomaly detection model that are familiar to the industries.

The simulation data listed in Table 1 are obtained by the data processing system 160 from the shutdown event of a 5-canister regenerative thermal oxidizer. The simulation is performed by an SOM classifier for normal model. In comparison to the model training method by using the combined historical data only and the model training method by using fresh data only, and the model training method by providing relevant data of cyclic processing steps, the data processing system and method of the present disclosure perform model training by using correct error data and align the historical data with newly sensed data, such that the true positive rate (TPR) of failure prediction could be greatly increased to 90.91%, and the pre-diagnostic results with a high accuracy can be achieved.

TABLE 1

| Type | Combining plurality of historical data and fresh data | Having a plurality of cyclic processing steps | Aligning data according to pattern correction and pattern features | TPR (%) | FPR (%) |
|---|---|---|---|---|---|
| Having abnormality detection | V | | | 72.73 | 0.132 |
| Having processing step | | V | | 72.73 | 0.162 |
| Present disclosure | V | V | V | 90.91 | 0.170 |

TPR: True Positive Rate; FPR: False Positive Rate

According to the data processing system and method of the present disclosure, the accuracy of the received sensor data is increased by determining the point pattern features of the sample point. Additionally, the data patterns are captured using a sliding window method, and patterns are compared according to data pattern features, such that the historical baseline data could be aligned with the newly sensor data. Thus, the problems caused by conventional methods could be avoided. For example, when actually processing data, there is often incorrect data due to being in a non-stable state, or generating noises, data missing, or data error. Or, the failure prediction system cannot be effectively established due to the historical baseline data not correctly aligned with new sensor data. Therefore, through pattern comparing and data aligning according to pattern features, the data processing system and method of the present disclosure could establish more correct failure prediction models by training and could effectively and greatly increase the TPR of device failure prediction.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A data processing system, comprising:
a cyclic correlation establishing module configured to receive a plurality of first sensor data, obtained from a first sensor operation performed on a plurality of processing devices, and receive a table of processing steps and cyclic procedures, and obtain a data correlation of the plurality of first sensor data according to a number of sample points in a data cycle of the plurality of first sensor data and the table of processing steps and cyclic procedures to correct the plurality of first sensor data;
a data pattern establishing module configured to obtain a plurality of first data pattern features of the plurality of first sensor data;
a data pattern alignment module configured to align a plurality of second sensor data obtained from a second sensor operation performed on the processing devices with the plurality of first sensor data according to the first data pattern features; and
a failure prediction module configured to perform prediction model training according to a plurality of first feature parameters of the plurality of first sensor data and a plurality of second feature parameters of the plurality of second sensor data which have been combined with each other to construct a failure prediction model, and perform failure prediction by using a plurality of third feature parameters extracted from a testing data according to the failure prediction model,
wherein the cyclic correlation establishing module is further configured to determine data accuracy between a first sample point of one of the plurality of first sensor data and a second sample point of another one of the plurality of first sensor data according to a point pattern feature of the first sample point and a point pattern feature of the second sample point corresponding to a number of shifting data points to correct one of the first sample point and the second sample point with reference to another one of the first sample point and the second sample point,
wherein when the similarity between a plurality of second data pattern features of the plurality of second sensor data and a plurality of first data pattern features of the plurality of first sensor data corresponding to the second data pattern features is greater than a threshold, the data pattern alignment module determines that the second data patterns are aligned with the corresponding first data patterns and the plurality of second sensor data are aligned with the plurality of first sensor data,
wherein the cyclic correlation establishing module, the data pattern establishing module and the data pattern alignment module are implemented by a computer processor performing programming codes corresponding to functions of the cyclic correlation establishing module, the data pattern establishing module and the data pattern alignment module, or the cyclic correlation establishing module, the data pattern establishing module and the data pattern alignment module are implemented by an application specific integrated circuit (ASIC), and
wherein the plurality of first sensor data or the plurality of second sensor data comprise sensor data of machine elements of the processing devices or parameters for detecting the operating state of the processing devices, one of the plurality of first sensor data and the plurality of second sensor data are historical baseline data, and another one of the plurality of first sensor data and the plurality of second sensor data are newly sensor data.

2. The data processing system according to claim 1, wherein the table of processing steps and cyclic procedures records an information of a plurality of processing steps of the processing devices and relevant cyclic operation modes of a plurality of cyclic procedures.

3. The data processing system according to claim 2, wherein the cyclic correlation establishing module is configured to obtain the number of sample points in a data cycle from the plurality of first sensor data by using an autocorrelation analysis method, obtain a sampling ratio of a number of processing steps and the number of sample points in a data cycle, and obtain a number of shifting data points of the plurality of first sensor data according to the sampling ratio to obtain the data correlation of the plurality of first sensor data.

4. The data processing system according to claim 2, wherein the cyclic correlation establishing module is further configured to obtain a number of step difference of the cyclic procedures to obtain the data correlation of the plurality of first sensor data, the data correlation of the plurality of first sensor data comprises the number of shifting data points between one of the plurality of first sensor data and another one of the plurality of first sensor data.

5. The data processing system according to claim 1, wherein the data pattern establishing module further obtains the point pattern feature of the first sample point by calculating a trend of the first sample point of one of the plurality of first sensor data and two sample points respectively preceding and following the first sample point, the trend is positive trend or negative trend.

6. The data processing system according to claim 1, wherein the data pattern establishing module is further configured to capture a plurality of data patterns of the plurality of first sensor data according to the number of sample points in a data cycle to obtain the first data pattern features of the plurality of first sensor data.

7. The data processing system according to claim 6, wherein the data pattern establishing module further obtains the first data pattern features by calculating the trend of a plurality of sample points of the plurality of first sensor data, the trend is positive trend or negative trend.

8. The data processing system according to claim 1, wherein the data pattern alignment module is further configured to capture the second data patterns of the plurality of second sensor data by using a sliding window method, obtain the second data pattern features of the second data patterns, and compare the second data pattern features with the corresponding first data pattern features.

9. The data processing system according to claim 1, further comprising a feature extraction module configured to extract the first feature parameters of the plurality of first sensor data and the second feature parameters of the plurality of second sensor data which have been aligned with the plurality of first sensor data, and combine the first feature parameters and the second feature parameters.

10. The data processing system according to claim 1, further comprising a graphic user interface (GUI) configured to display at least one option relevant to the cyclic operation mode.

11. A data processing method, comprising:
receiving a plurality of first sensor data, obtained from a first sensor operation performed on a plurality of processing devices, and receiving a table of processing steps and cyclic procedures, and obtaining a data correlation of the plurality of first sensor data according to a number of sample points in a data cycle of the plurality of first sensor data and the table of processing steps and cyclic procedures to correct the plurality of first sensor data;
obtaining a plurality of first data pattern features according to the plurality of first sensor data;
aligning a plurality of second sensor data obtained from a second sensor operation performed on the processing devices with the plurality of first sensor data according to the first data pattern features; and
performing prediction model training according to a plurality of first feature parameters of the plurality of first sensor data and a plurality of second feature parameters of the plurality of second sensor data which have been combined with each other to construct a failure prediction model, and perform failure prediction by using a plurality of third feature parameters extracted from a testing data according to the failure prediction model,
wherein the step of obtaining a data correlation of the plurality of first sensor data according to a number of sample points in a data cycle of the plurality of first sensor data and the table of processing steps and cyclic procedures to correct the plurality of first sensor data further comprises determining data accuracy between a first sample point of one of the plurality of first sensor data and a second sample point of another one of the plurality of first sensor data according to a point pattern feature of the first sample point and a point pattern feature of the second sample point corresponding to a number of shifting data points to correct one of the first sample point and the second sample point with reference to another one of the first sample point and the second sample point,
wherein the step of aligning a plurality of second sensor data obtained from a second sensor operation performed on the processing devices with the plurality of first sensor data according to the first data pattern features comprises when the similarity between a plurality of second data pattern features of the plurality of second sensor data and a plurality of first data pattern features of the plurality of first sensor data corresponding to the second data pattern features is greater than a threshold, it is determined that the second data patterns are aligned with the corresponding first data patterns and the plurality of second sensor data are aligned with the plurality of first sensor data, and
wherein the plurality of first sensor data or the plurality of second sensor data comprise sensor data of machine elements of the processing devices or parameters for detecting the operating state of the processing devices, one of the plurality of first sensor data and the plurality of second sensor data are historical baseline data, and another one of the plurality of first sensor data and the plurality of second sensor data are newly sensor data.

12. The data processing method according to claim 11, wherein the table of processing steps and cyclic procedures records an information of a plurality of processing steps of the processing devices and relevant cyclic operation modes of a plurality of cyclic procedures.

13. The data processing method according to claim 12, wherein the number of sample points in a data cycle is obtained from the plurality of first sensor data by using an autocorrelation analysis method, a sampling ratio of a number of processing steps and the number of sample points in a data cycle is obtained, and a number of shifting data points of the plurality of first sensor data according to the sampling ratio is obtained to obtain the data correlation of the plurality of first sensor data.

14. The data processing method according to claim 12, wherein the step of obtaining the data correlation of the plurality of first sensor data according to the number of sample points in a data cycle of the plurality of first sensor data and the table of processing steps and cyclic procedures to correct the plurality of first sensor data comprises: obtaining a number of step difference of the cyclic procedures to obtain a data correlation of the plurality of first sensor data, the data correlation of the plurality of first sensor data comprises the number of shifting data points of one of the plurality of first sensor data and another one of the plurality of first sensor data.

15. The data processing method according to claim 11, wherein the point pattern feature of the first sample point is obtained by calculating a trend of the first sample point of one of the plurality of first sensor data and two sample points respectively preceding and following the first sample point, the trend is positive trend or negative trend.

16. The data processing method according to claim 11, wherein the step of obtaining the first data pattern features of the plurality of first sensor data according to the plurality of first sensor data comprises capturing a plurality of data patterns of the plurality of first sensor data according to the number of sample points in a data cycle to obtain the first data pattern features of the plurality of first sensor data.

17. The data processing method according to claim 16, wherein the first data pattern features are obtained by calculating the trend of a plurality of sample points of the plurality of first sensor data, the trend is positive trend or negative trend.

18. The data processing method according to claim 11, wherein the step of aligning the plurality of second sensor data obtained from the second sensor operation performed on the processing devices with the plurality of first sensor data according to the first data pattern features comprises:

capturing the second data patterns of the plurality of second sensor data by using a sliding window method, and obtaining the second data pattern features of the second data patterns; and comparing the second data pattern features with the first data pattern features corresponding to the second data pattern features.

19. The data processing method according to claim 11, further comprising:

extracting the first feature parameters of the plurality of first sensor data and the second feature parameters of the plurality of second sensor data which have been aligned with the plurality of first sensor data, and combining the first feature parameters and the second feature parameters.

20. The data processing method according to claim 11, further comprising: displaying at least one option relevant to the cyclic operation mode on a graphic user interface.

* * * * *